US012326846B2

(12) United States Patent
Rice et al.

(10) Patent No.: US 12,326,846 B2
(45) Date of Patent: Jun. 10, 2025

(54) TABLE PARTITIONING WITHIN DISTRIBUTED DATABASE SYSTEMS

(71) Applicant: DASSAULT SYSTEMES SE, Velizy Villacoublay (FR)

(72) Inventors: Michael Thomas Rice, Bellingham, MA (US); Oleg Levin, Acton, MA (US); Yan Avlasov, Lexington, MA (US); Seth Theodore Proctor, Arlington, MA (US); Thomas Jonathan Harwood, Concord, MA (US)

(73) Assignee: Dassault Systemes SE, Velizy Villacoublay (FR)

( * ) Notice: Subject to any disclaimer, the term of this patent is extended or adjusted under 35 U.S.C. 154(b) by 312 days.

(21) Appl. No.: 17/721,142

(22) Filed: Apr. 14, 2022

(65) Prior Publication Data

US 2022/0237166 A1    Jul. 28, 2022

Related U.S. Application Data

(63) Continuation of application No. 16/054,357, filed on Aug. 3, 2018, now Pat. No. 11,314,714, which is a
(Continued)

(51) Int. Cl.
*G06F 16/22* (2019.01)
*G06F 16/27* (2019.01)

(52) U.S. Cl.
CPC .......... *G06F 16/2282* (2019.01); *G06F 16/27* (2019.01)

(58) Field of Classification Search
CPC ............................. G06F 16/2282; G06F 16/27
See application file for complete search history.

(56) References Cited

U.S. PATENT DOCUMENTS 4,853,843 A    8/1989  Ecklund
5,446,887 A    8/1995  Berkowitz
(Continued)

FOREIGN PATENT DOCUMENTS

CN    1477562 A    2/2004
CN    1784676 A    6/2006
(Continued)

OTHER PUBLICATIONS

International Search Report dated Sep. 26, 2012 from PCT/US2011/029056, 4 pp.
(Continued)

*Primary Examiner* — Sherief Badawi
*Assistant Examiner* — Jessica N Le
(74) *Attorney, Agent, or Firm* — Smith Baluch LLP

(57) ABSTRACT

Techniques are disclosed for implementing a unified partitioning scheme within distributed database systems to allow a table to be horizontally partitioned and those partitions stored on and serviced by a storage group. A storage group is a subset of storage manager (SM) nodes, and each SM node is configured to persist database data in durable storage. The distributed database system assigns each storage group to a subset of SM nodes. The distributed database system can address each storage group using a symbolic mapping that allows transactions to identify a particular storage group, and to direct read and write operations to a subset of SM nodes servicing that storage group. An administrator can update this mapping on-the-fly to cause the distributed database system to dynamically adjust an implemented partitioning scheme without necessarily interrupting on-going database operations.

18 Claims, 17 Drawing Sheets

Related U.S. Application Data continuation of application No. 14/725,916, filed on May 29, 2015, now Pat. No. 10,067,969.

(56) References Cited

U.S. PATENT DOCUMENTS

| | | | |
|---|---|---|---|
| 5,448,727 A * | 9/1995 | Annevelink | G06F 16/284 |
| 5,524,240 A | 6/1996 | Barbara et al. | |
| 5,555,404 A | 9/1996 | Torbjørnsen et al. | |
| 5,568,638 A | 10/1996 | Hayashi et al. | |
| 5,701,467 A | 12/1997 | Freeston | |
| 5,764,877 A | 6/1998 | Lomet et al. | |
| 5,813,005 A * | 9/1998 | Tsuchida | G06F 16/24532 |
| 5,960,194 A | 9/1999 | Choy et al. | |
| 6,014,656 A * | 1/2000 | Hallmark | G06F 16/24557 |
| | | | 707/999.005 |
| 6,216,151 B1 | 4/2001 | Antoun | |
| 6,226,650 B1 | 5/2001 | Mahajan et al. | |
| 6,275,863 B1 | 8/2001 | Leff et al. | |
| 6,334,125 B1 | 12/2001 | Johnson et al. | |
| 6,401,096 B1 | 6/2002 | Zellweger | |
| 6,424,967 B1 | 7/2002 | Johnson et al. | |
| 6,480,857 B1 | 11/2002 | Chandler | |
| 6,499,036 B1 | 12/2002 | Gurevich | |
| 6,523,036 B1 | 2/2003 | Hickman et al. | |
| 6,748,394 B2 | 6/2004 | Shah et al. | |
| 6,792,432 B1 | 9/2004 | Kodavalla et al. | |
| 6,862,589 B2 | 3/2005 | Grant | |
| 7,026,043 B2 | 4/2006 | Jander | |
| 7,080,083 B2 | 7/2006 | Kim et al. | |
| 7,080,101 B1 * | 7/2006 | Watson | G06F 16/2282 |
| 7,096,216 B2 | 8/2006 | Anonsen | |
| 7,219,102 B2 | 5/2007 | Zhou et al. | |
| 7,233,960 B1 | 6/2007 | Boris et al. | |
| 7,293,039 B1 | 11/2007 | Deshmukh et al. | |
| 7,353,227 B2 | 4/2008 | Wu | |
| 7,395,352 B1 | 7/2008 | Lam et al. | |
| 7,401,094 B1 | 7/2008 | Kesler | |
| 7,403,948 B2 | 7/2008 | Ghoneimy et al. | |
| 7,562,102 B1 | 7/2009 | Sumner et al. | |
| 7,853,624 B2 | 12/2010 | Friedlander et al. | |
| 7,890,508 B2 | 2/2011 | Gerber et al. | |
| 7,949,687 B1 * | 5/2011 | Sinclair | G06F 16/2282 |
| | | | 707/758 |
| 8,108,343 B2 | 1/2012 | Wang et al. | |
| 8,224,860 B2 | 7/2012 | Starkey | |
| 8,266,122 B1 | 9/2012 | Newcombe et al. | |
| 8,504,523 B2 | 8/2013 | Starkey | |
| 8,583,598 B2 | 11/2013 | Shaull et al. | |
| 8,756,237 B2 | 6/2014 | Stillerman et al. | |
| 9,489,443 B1 | 11/2016 | Muniswamy-Reddy et al. | |
| 9,501,363 B1 | 11/2016 | Ottavio | |
| 9,632,878 B1 * | 4/2017 | Maccanti | G06F 11/1469 |
| 9,697,253 B2 | 7/2017 | Chidambaran et al. | |
| 9,734,021 B1 | 8/2017 | Sanocki et al. | |
| 9,830,333 B1 * | 11/2017 | Wisniewski | G06F 16/182 |
| 9,930,312 B2 * | 3/2018 | Kim | G06T 3/00 |
| 10,025,673 B1 * | 7/2018 | Maccanti | G06F 11/1451 |
| 10,037,348 B2 | 7/2018 | Proctor et al. | |
| 10,067,969 B2 | 9/2018 | Rice et al. | |
| 10,108,690 B1 * | 10/2018 | Murray | G06F 16/278 |
| 10,180,954 B2 * | 1/2019 | Palmer | G06F 16/2315 |
| 10,884,869 B2 | 1/2021 | Shaull | |
| 10,922,303 B1 * | 2/2021 | Bruck | G06F 16/2365 |
| 11,222,008 B2 | 1/2022 | Palmer | |
| 11,314,714 B2 | 4/2022 | Rice et al. | |
| 2002/0026603 A1 | 2/2002 | LeCrone et al. | |
| 2002/0112054 A1 | 8/2002 | Hatanaka | |
| 2002/0152261 A1 | 10/2002 | Arkin et al. | |
| 2002/0152262 A1 | 10/2002 | Arkin et al. | |
| 2002/0178162 A1 | 11/2002 | Ulrich et al. | |
| 2003/0051021 A1 | 3/2003 | Hirschfeld et al. | |
| 2003/0149709 A1 | 8/2003 | Banks | |
| 2003/0204486 A1 | 10/2003 | Berks et al. | |
| 2003/0220935 A1 | 11/2003 | Vivian et al. | |
| 2004/0153459 A1 | 8/2004 | Whitten et al. | |
| 2004/0263644 A1 | 12/2004 | Ebi | |
| 2005/0013208 A1 | 1/2005 | Hirabayashi et al. | |
| 2005/0086384 A1 | 4/2005 | Ernst | |
| 2005/0086430 A1 * | 4/2005 | Allen | G06F 3/0685 |
| | | | 711/170 |
| 2005/0198062 A1 | 9/2005 | Shapiro | |
| 2005/0216502 A1 | 9/2005 | Kaura et al. | |
| 2006/0010130 A1 | 1/2006 | Leff et al. | |
| 2006/0235823 A1 | 10/2006 | Chong et al. | |
| 2007/0043749 A1 * | 2/2007 | Gerber | G06F 16/2343 |
| 2007/0067349 A1 | 3/2007 | Jhaveri et al. | |
| 2007/0073829 A1 | 3/2007 | Volodarsky et al. | |
| 2007/0143259 A1 * | 6/2007 | Uppala | G06F 16/24554 |
| 2007/0198599 A1 | 8/2007 | Tobies | |
| 2008/0086470 A1 | 4/2008 | Graefe | |
| 2008/0228795 A1 | 9/2008 | Lomet | |
| 2008/0320038 A1 | 12/2008 | Liege | |
| 2009/0113431 A1 | 4/2009 | Whyte | |
| 2010/0094802 A1 | 4/2010 | Uotojarvi et al. | |
| 2010/0115246 A1 * | 5/2010 | Seshadri | G06F 16/24532 |
| | | | 712/225 |
| 2010/0153349 A1 | 6/2010 | Schroth et al. | |
| 2010/0191884 A1 | 7/2010 | Holenstein et al. | |
| 2010/0235606 A1 | 9/2010 | Oreland et al. | |
| 2010/0241614 A1 | 9/2010 | Shaull et al. | |
| 2010/0297565 A1 | 11/2010 | Waters et al. | |
| 2011/0087874 A1 | 4/2011 | Timashev et al. | |
| 2011/0225167 A1 | 9/2011 | Bhattacharjee et al. | |
| 2011/0231447 A1 * | 9/2011 | Starkey | G06F 16/27 |
| | | | 707/E17.055 |
| 2011/0302583 A1 | 12/2011 | Abadi et al. | |
| 2012/0102022 A1 | 4/2012 | Miranker et al. | |
| 2012/0136904 A1 | 5/2012 | Ravi | |
| 2012/0254175 A1 | 10/2012 | Horowitz et al. | |
| 2013/0060922 A1 | 3/2013 | Koponen et al. | |
| 2013/0110766 A1 | 5/2013 | Promhouse et al. | |
| 2013/0110774 A1 | 5/2013 | Shah et al. | |
| 2013/0110781 A1 | 5/2013 | Golab et al. | |
| 2013/0159265 A1 | 6/2013 | Peh et al. | |
| 2013/0159366 A1 | 6/2013 | Lyle et al. | |
| 2013/0179482 A1 | 7/2013 | Becker et al. | |
| 2013/0232378 A1 | 9/2013 | Resch et al. | |
| 2013/0262403 A1 | 10/2013 | Milousheff et al. | |
| 2013/0278412 A1 | 10/2013 | Kelly et al. | |
| 2013/0290249 A1 | 10/2013 | Merriman et al. | |
| 2013/0297565 A1 | 11/2013 | Starkey | |
| 2013/0311424 A1 | 11/2013 | Rodrigo | |
| 2013/0311426 A1 | 11/2013 | Erdogan et al. | |
| 2014/0095450 A1 * | 4/2014 | Marwah | G06F 16/21 |
| | | | 707/668 |
| 2014/0108414 A1 | 4/2014 | Stillerman et al. | |
| 2014/0108633 A1 | 4/2014 | Dai et al. | |
| 2014/0122484 A1 * | 5/2014 | Jagtiani | G06F 16/2282 |
| | | | 707/E17.005 |
| 2014/0149353 A1 | 5/2014 | Lee et al. | |
| 2014/0172914 A1 | 6/2014 | Elnikety et al. | |
| 2014/0279881 A1 | 9/2014 | Tan et al. | |
| 2014/0279929 A1 | 9/2014 | Gupta et al. | |
| 2014/0297676 A1 | 10/2014 | Bhatia et al. | |
| 2014/0304306 A1 | 10/2014 | Proctor et al. | |
| 2014/0310260 A1 | 10/2014 | Wu et al. | |
| 2015/0019496 A1 | 1/2015 | Stewart et al. | |
| 2015/0019739 A1 | 1/2015 | Attaluri et al. | |
| 2015/0032695 A1 | 1/2015 | Tran et al. | |
| 2015/0066850 A1 * | 3/2015 | Oliver | G06F 12/02 |
| | | | 707/620 |
| 2015/0066858 A1 | 3/2015 | Sabdar et al. | |
| 2015/0128063 A1 | 5/2015 | Jones et al. | |
| 2015/0134626 A1 * | 5/2015 | Theimer | G06F 11/3055 |
| | | | 707/693 |
| 2015/0135255 A1 * | 5/2015 | Theimer | H04L 67/1027 |
| | | | 726/1 |
| 2015/0149509 A1 * | 5/2015 | Leu | G06F 16/27 |
| | | | 707/803 |
| 2015/0149513 A1 | 5/2015 | Beigel et al. | |
| 2015/0199415 A1 | 7/2015 | Bourbonnais et al. | |
| 2015/0370505 A1 | 12/2015 | Shuma et al. | |
| 2016/0134490 A1 | 5/2016 | Balasubramanyan et al. | |

(56) References Cited

U.S. PATENT DOCUMENTS

| | | | |
|---|---|---|---|
| 2016/0306709 | A1 | 10/2016 | Shaull et al. |
| 2016/0350357 | A1 | 12/2016 | Palmer |
| 2016/0350392 | A1* | 12/2016 | Rice .................. G06F 16/27 |
| 2016/0371355 | A1 | 12/2016 | Massari et al. |
| 2017/0039099 | A1 | 2/2017 | Ottavio |
| 2018/0357264 | A1 | 12/2018 | Rice et al. |
| 2021/0173746 | A1 | 6/2021 | Shaull |
| 2022/0253427 | A1 | 8/2022 | Palmer |

FOREIGN PATENT DOCUMENTS

| | | |
|---|---|---|
| CN | 102436490 A | 5/2012 |
| CN | 102667711 A | 9/2012 |
| EA | 002931 B1 | 10/2002 |
| EP | 1403782 A2 | 3/2004 |
| JP | 2003256256 A | 9/2003 |
| JP | 2006048507 A | 2/2006 |
| JP | 2007058275 A | 3/2007 |
| RU | 2315349 C1 | 1/2008 |
| RU | 2008106904 A | 8/2009 |
| WO | 2006090367 A2 | 8/2006 |

OTHER PUBLICATIONS

Iqbal, A. M. et al., "Performance Tradeoffs in Static and Dynamic Load Balancing Strategies," Institute for Computer Applications in Science and Engineering, 1986, pp. 1-23.

Leverenz et al., "Oracle8i Concepts, Partitioned Tables and Indexes," Chapter 11, pp. 11-12-11/66 (1999).

Non-Final Office Action dated Apr. 12, 2017 from U.S. Appl. No. 14/247,364, 12 pp.

Non-Final Office Action dated Feb. 1, 2016 from U.S. Appl. No. 14/215,461, 19 pp.

Non-Final Office Action dated Feb. 6, 2014 from U.S. Appl. No. 13/933,483, 14 pp.

Non-Final Office Action dated Jan. 21, 2016 from U.S. Appl. No. 14/215,401, 19 pp.

Non-Final Office Action dated Jun. 1, 2017 from U.S. Appl. No. 14/215,461, 21 pp.

Non-Final Office Action dated Jun. 2, 2017 from U.S. Appl. No. 14/744,546, 25 pp.

Non-Final Office Action dated May 19, 2016 from U.S. Appl. No. 14/247,364, 24 pp.

Non-Final Office Action dated May 31, 2017 from U.S. Appl. No. 14/215,401, 27 pp.

Non-Final Office Action dated Oct. 10, 2012 from U.S. Appl. No. 13/525,953, 8 pp.

Non-Final Office Action dated Sep. 11, 2017 from U.S. Appl. No. 14/725,916, 17 pages.

Non-Final Office Action dated Sep. 19, 2017 from U.S. Appl. No. 14/726,200, 37 pages.

Non-Final Office Action dated Sep. 21, 2017 from U.S. Appl. No. 14/688,396, 31 pages.

Non-Final Office Action dated Sep. 23, 2016 from U.S. Appl. No. 14/616,713, 8 pp.

Notice of Allowance dated Apr. 1, 2013 from U.S. Appl. No. 13/525,953, 10 pp.

Notice of Allowance dated Feb. 29, 2012 from U.S. Appl. No. 13/051,750, 8 pp.

Notice of Allowance dated Jul. 27, 2016 from U.S. Appl. No. 14/215,372, 12 pp.

Notice of Allowance dated May 14, 2012 from U.S. Appl. No. 13/051,750, 8 pp.

Notice of Allowance dated May 3, 2018 for U.S. Appl. No. 14/725,916, 13 pages.

Oracle Database Concepts 10g Release 2 (10.2), Oct. 2005, 14 pages.

Özsu et al., Principles of distributed database systems. Springer Science & Business Media, Chapter 13- Data Replication, 2011. 41 pages.

Rahimi, S. K. et al., "Distributed Database Management Systems: A Practical Approach," IEEE Computer Society, John Wiley & Sons, Inc. Publications (2010), 765 pp.

Roy, N. et al., "Efficient Autoscaling in the Cloud using Predictive Models for Workload Forecasting," IEEE 4th International Conference on Cloud Computing, 2011, pp. 500-507.

Searchcloudapplications.techtarget.com, Autoscaling Definition, Aug. 2012, 1 page.

Shaull et al., "Skippy: a new snapshot indexing method for time travel in the storage manager." Proceedings of the 2008 ACM SIGMOD international conference on Management of data. ACM, 2008. 12 pages.

Shaull, R. et al., "A Modular and Efficient Past State System for Berkeley DB," Proceedings of USENIX ATC '14:2014 USENIX Annual Technical Conference, 13 pp. (Jun. 19-20, 2014).

Shaull, R., "Retro: A Methodology for Retrospection Everywhere," A Dissertation Presented to the Faculty of the Graduate School of Arts and Sciences of Brandeis University, Waltham, Massachusetts, Aug. 2013, 174 pp.

Terry et al., "Managing update conflicts in Bayou, a weakly connected replicated storage system." ACM SIGOPS Operating Systems Review. vol. 29. No. 5. ACM, 1995. 12 pages.

U.S. Appl. No. 14/215,372, filed Mar. 17, 2014, Ottavio.
U.S. Appl. No. 14/215,401, filed Mar. 17, 2014, Palmer.
U.S. Appl. No. 14/215,461, filed Mar. 17, 2014, Palmer.
U.S. Appl. No. 14/616,713, filed Feb. 8, 2015, Levin.
U.S. Appl. No. 14/688,396, filed Apr. 16, 2015, Shaull.
U.S. Appl. No. 14/725,916, filed May 29, 2015, Rice.
U.S. Appl. No. 14/726,200, filed May 29, 2015, Palmer.
U.S. Appl. No. 14/744,546, filed Jun. 19, 2015, Massari.
U.S. Appl. No. 15/296,439, filed Oct. 18, 2016, Ottavio.

Veerman, G. et al., "Database Load Balancing, MySQL 5.5 vs PostgreSQL 9.1," Universiteit van Amsterdam, System & Network Engineering, Apr. 2, 2012, 51 pp.

Yousif, M. "Shared-Storage Clusters," Cluster Computing, Baltzer Science Publishers, Bussum, NL, vol. 2, No. 4, pp. 249-257 (1999).

"Album Closing Policy," Background, retrieved from the Internet at URL:http://tools/wiki/display/ENG/Album+Closing+Policy (Jan. 29, 2015), 4 pp.

"Distributed Coordination in NuoDB," YouTube, retrieved from the Internet at URL:https://www.youtube.com/watch?feature=player_embedded&v=URoeHvflVKg on Feb. 4, 2015, 2 pp.

"Durable Distributed Cache Architecture", retrieved from the Internet at URL: http://www.nuodb.com/explore/newsql-cloud-database-ddc-architecture on Feb. 4, 2015, 3 pages.

"Glossary—NuoDB 2.1 Documentation / NuoDB," retrieved from the Internet at URL: http://doc.nuodb.com/display/doc/Glossary on Feb. 4, 2015, 1 pp.

"How It Works," retrieved from the Internet at URL: http://www.nuodb.com/explore/newsql-cloud-database-how-it-works?mkt_tok=3RkMMJW on Feb. 4, 2015, 4 pp.

"How to Eliminate MySQL Performance Issues," NuoDB Technical Whitepaper, Sep. 10, 2014, Version 1, 11 pp.

"Hybrid Transaction and Analytical Processing with NuoDB," NuoDB Technical Whitepaper, Nov. 5, 2014, Version 1, 13 pp.

"No Knobs Administration," retrieved from the Internet at URL: http://www.nuodb.com/explore/newsql-cloud-database-product/auto-administration on Feb. 4, 2015, 4 pp.

"NuoDB at a Glance," retrieved from the Internet at URL: http://doc.nuodb.com/display/doc/NuoDB+at+a+Glance on Feb. 4, 2015, 1 pp.

"SnapShot Albums," Transaction Ordering, retrieved from the Internet at URL:http://tools/wiki/display/ENG/Snapshot+Albums (Aug. 12, 2014), 4 pp.

"Table Partitioning and Storage Groups (TPSG)," Architect's Overview, NuoDB Technical Design Document, Version 2.0 (2014), 12 pp.

"The Architecture & Motivation for NuoDB," NuoDB Technical Whitepaper, Oct. 5, 2014, Version 1, 27 pp.

"Welcome to NuoDB Swifts Release 2.1 GA," retrieved from the Internet at URL: http://dev.nuodb.com/techblog/welcome-nuodb-swifts-release-21-ga on Feb. 4, 2015, 7 pp.

(56) References Cited

OTHER PUBLICATIONS

Advisory Action issued by The United States Patent and Trademark Office for U.S. Appl. No. 14/215,461, dated Jan. 10, 2017, 9 pages.
Amazon CloudWatch Developer Guide API, Create Alarms That or Terminate an Instance, Jan. 2013, downloaded Nov. 16, 2016 from archive.org., pp. 1-11.
Amazon RDS FAQs, Oct. 4, 2012, downloaded Nov. 16, 2016 from archive.org., 39 pp.
Bergsten et al., "Overview of Parallel Architectures for Databases," The Computer Journal vol. 36, No. 8, pp. 734-740 (1993).
Connectivity Testing with Ping, Telnet, Trace Route and NSlookup (hereafter help.webcontrolcenter), Article ID:1757, Created: Jun. 17, 2013 at 10:45 a.m., https://help.webcontrolcenter.com/kb/a1757/connectivity-testing-with-ping-telnet-trace-route-and-nslookup.aspx, 6 pages.
Dan et al., "Performance Comparisons of Buffer Coherency Policies," Proceedings of the International Conference on Distributed Computer Systems, IEEE Comp. Soc. Press vol. 11, pp. 208-217 (1991).
Decision to Grant dated Nov. 14, 2016 from Belarus Patent Application No. a20121441 with English Translation, 15 pp.
Extended European Search Report for European Patent Application No. 16780794.0 mailed Sep. 19, 2018. 8 pages.
Extended European Search Report in European Patent Application No. 16804117.6 dated Nov. 2, 2018, 11 pages.
Extended European Search Report in European Patent Application No. 16804119.2 dated Dec. 4, 2018, 8 pages.
Extended European Search Report in European Patent Application No. 16812485.7 dated Dec. 11, 2018, 9 pages.
Final Office Action dated Apr. 12, 2018 for U.S. Appl. No. 14/726,200, 6 pages.
Final Office Action dated Apr. 27, 2018 for U.S. Appl. No. 14/688,396, 37 pages.
Final Office Action dated Dec. 13, 2016 from U.S. Appl. No. 14/247,364, 31 pp.
Final Office Action dated Feb. 9, 2018 from U.S. Appl. No. 14/744,546, 22 pages.
Final Office Action dated Nov. 24, 2017 from U.S. Appl. No. 14/215,401, 33 pages.
Final Office Action dated Nov. 3, 2016 from U.S. Appl. No. 14/215,401, 36 pp.
Final Office Action dated Nov. 7, 2017 from U.S. Appl. No. 14/247,364, 13 pages.
Final Office Action dated Sep. 9, 2016 from U.S. Appl. No. 14/215,461, 26 pp.
First Examination Report issued by the Canadian Intellectual Property Office for Application No. 2,793,429, dated Feb. 14, 2017, 3 pages.
Garding, P. "Alerting on Database Mirorring Events," Apr. 7, 2006, downloaded Dec. 6, 2016 from technet.microsoft.com, 24 pp.
Hull, Autoscaling MySQL on Amazon EC2, Apr. 9, 2012, 7 pages.
International Preliminary Report on Patentability dated Oct. 13, 2015 from PCT/US2014/033270, 4 pp.
International Search Report and Written Opinion dated Aug. 21, 2014 for PCT/US2014/033270, 5 pp.
International Search Report and Written Opinion dated Jul. 15, 2016 from PCT/US2016/27658, 37 pp.
International Search Report and Written Opinion dated Oct. 28, 2016 from PCT/US16/34651, 16 pp.
International Search Report and Written Opinion dated Sep. 8, 2016 from PCT/US16/37977, 11 pp.
International Search Report and Written Opinion dated Sep. 9, 2016 from PCT/US16/34646, 12 pp.
U.S. Appl. No. 17/109,353, filed Dec. 2, 2020, Shaull.
U.S. Appl. No. 17/572,347 filed Jan. 10, 2022, Palmer.
Communication pursuant to Art 94(3) EPC dated Aug. 1, 2022 in European Application No. 16780794.0, 6 pages.
Examiner's Report dated Jan. 31, 2023 in Canadian Application No. 2987822, 6 pages.
Extended European Search Report dated Jun. 28, 2022 in European Application No. 21216212.7, 10 pages.
KLIEB "Distributed disconnected databases." Proceedings of the 1996 ACM symposium on Applied Computing. 1996, 5 pages.
Snapshot (computer storage) Wikipedia, anonymous, Mar. 22, 2015, CP055939439, retrieved from the internet: URL: https://en.wikipedia.org/w/index.php?title=Snapshot_(computer_storagE[retrieved on Jul. 6, 2022], 5 pages.
Office Action with translation in Korean Application No. 10-2017-7033167 dated Mar. 23, 2023, 16 pages.
"What Is A Distributed Database? And Why Do You Need One," NuoDB Technical Whitepaper, Jan. 23, 2014, Version 1, 9 pp.
Anonymous "Technical Whitepaper: The Architecture and Motivation for NuoDB" DBTA Download/Webinars, 2013, pp. 1-27, XP055932481, Retrieved from the Internet: URL:https://www.dbta.com/DBTA-Downloads/WhitePapers/Technical-Whitepaper-The-Architecture-and-Motivation-for-NuoDB-4419.pdf [retrieved on Jun. 17, 2022].
Examiner's Report dated May 30, 2022 in Canadian Application No. 2987822, 4 pages.
Herlihy et al., "Transactional Memory: architectural support for lock-free data structures," In Proceedings of the 1993 International Symposium on Computer Architecture, May 1993, San Diego, CA, 12 pages.
Ladin et al., "Providing high availability using lazy replication," ACM Trans. Comput. Syst. (1992), 32 pages, DOI:10.1145/138873.138877Corpus ID: 2219840.
Notification of Oral Proceedings in EP Application No. 16804119.2 dated Jul. 8, 2022, 14 pages.
Shaull et al., "Skippy: Enabling long-lived snapshots of the long-lived past." 2008 IEEE 24th International Conference on Data Engineering. IEEE, 2008. 3 pages.
Shrira et al., "Thresher: An Efficient Storage Manager for Copy-on-write Snapshots." USENIX Annual Technical Conference, General Track. 2006. 14 pages.
Shrira et al., "Time travel in the virtualized past: Cheap fares and first class seats." Haifa Systems and Storage Conference, SYSTOR. 2007. 6 pages.

\* cited by examiner

601

```
CREATE TABLE inventory (
   ID INTEGER,
   account_ID INTEGER,
   c_ID INTEGER,
   price INTEGER,
   b_ID INTEGER,
   territory CHAR(2)
) PARTITION BY LIST (territory)
  PARTITION pnw VALUES IN ('WA', 'WY') STORE IN SNW,
  PARTITION pne VALUES IN ('NY', 'CT') STORE IN SNE,
  PARTITION psw VALUES IN ('CA', 'AZ') STORE IN SSW,
  PARTITION pse VALUES IN ('FL', 'GA') STORE IN SSE;
);
```

```
CREATE TABLE inventory (
        ID INTEGER, account_ID INTEGER, c_ID INTEGER, price INTEGER, b_ID
INTEGER, territory CHAR(2)
        )
        PARTITION BY LIST (territory) SUBPARTITION BY RANGE (price) (
        PARTITION VALUES IN ('WA', 'WY') STORE IN snw (
                SUBPARTITION snwlow VALUES LESS THAN (1000) STORE IN snw1,
                SUBPARTITION snwmid VALUES LESS THAN (10000) STORE IN snw2,
                SUBPARTITION snwhigh VALUES LESS THAN (MAXVALUE)
        ),                                    672              674              676
        PARTITION VALUES IN ('NY', 'CT') STORE IN sne (
                    SUBPARTITION snelow VALUES LESS THAN (1000),
                    SUBPARTITION snemid VALUES LESS THAN (10000),
                    SUBPARTITION snehigh VALUES LESS THAN (MAXVALUE)
        ),
        PARTITION VALUES IN ('CA', 'AZ') STORE IN ssw (
                    SUBPARTITION sswlow VALUES LESS THAN (1000),
                    SUBPARTITION sswmid VALUES LESS THAN (10000),
                    SUBPARTITION sswhigh VALUES LESS THAN (MAXVALUE)
        ),
        PARTITION VALUES IN ('FL', 'GA') STORE IN sse (
                    SUBPARTITION sselow VALUES LESS THAN (1000),
                    SUBPARTITION ssemid VALUES LESS THAN (10000),
                    SUBPARTITION ssehigh VALUES LESS THAN (MAXVALUE)
        )
        );

TABLE PARTITIONING WITHIN DISTRIBUTED DATABASE SYSTEMS

RELATED APPLICATIONS

This application is a continuation of U.S. application Ser. No. 16/054,357, entitled "TABLE PARTITIONING WITHIN DISTRIBUTED DATABASE SYSTEMS" and filed on Aug. 3, 2018, which is a continuation application of U.S. application Ser. No. 14/725,916, entitled "TABLE PARTITIONING WITHIN DISTRIBUTED DATABASE SYSTEMS," filed on May 29, 2015. Both of these applications are incorporated herein by reference in their entireties for all purposes.

FIELD OF DISCLOSURE

The present disclosure relates generally to database systems, and more particularly to table partitioning in a distributed database system.

BACKGROUND

Database partitioning enables a database table to be divided into smaller pieces, also referred to as "partitions." Partitioning is often applied to large tables and associated indices since it allows them to be broken into smaller and more manageable pieces. A database table can be partitioned in a number of ways. Horizontal partitioning, for example, involves storing each row in a particular partition based on a respective column value. Vertical partitioning, on the other hand, involves creating partitions with fewer columns and using additional partitions to store the remaining columns. In a distributed database system, table partitions can be distributed among multiple computer hosts, which are also referred to as "nodes". Each node provides user-level access to its partitions for query purposes. In principle, this increases overall database performance since transactional workloads can be distributed among the nodes, and can target those partitions most pertinent to a particular transaction.

Horizontal partitioning can be implemented on the basis of a partitioning policy that defines at least one partition key and multiple criteria. The partition key is a column containing the values which will form the basis of the partitioning; these values are referred to as key values. Each of the criteria defines a condition and a partition identifier. A database record, represented by a row in the database table, that satisfies a particular criterion is stored in a partition corresponding to the partition identifier associated with the satisfied criterion. The criteria that form part of a partitioning policy can define a variety of different partitioning schemes, including range partitioning (in which records having key values falling within a defined range are partitioned together), list partitioning (in which records having listed key values are partitioned together), hash partitioning (in which records having a key value hash are partitioned together), and combinations of the foregoing. While different partitioning policies define different ways of partitioning a database table, each achieves the same thing in a general sense: each ensures that a particular database record is maintained in an appropriate partition, and that subsequent queries can locate and perform database operations using that record.

These concepts can be illustrated with reference to horizontal partitioning of a simple database table that contains a list of given names and a gender for each name. The columns of such a database table are "name" and "gender." This database table can be divided into two partitions, one that contains male names and is identified by partition identifier "MN", and one that contains female names and is identified by partition identifier "FN". This partitioning can be accomplished based on a partitioning policy that defines the "gender" column as the partition key, and that further defines two criteria. One criterion is, "Store records having 'gender'='male' in the partition corresponding to partition identifier 'MN'". Another criterion is, "Store records having 'gender'='female' in the partition corresponding to partition identifier 'FN'". Applying this partitioning policy to the database table will result in the records comprising the database table to be divided into a first partition containing only male names, and a second partition containing only female names.

BRIEF DESCRIPTION OF THE DRAWINGS

FIG. 6b illustrates an example data definition language (DDL) operation that defines a partitioning policy.

FIG. 6c illustrates an example data definition language (DDL) that defines a partitioning policy that includes sub-partitioning.

FIG. 8b is illustrates an example data flow associated with the methodology illustrated in FIG. 8a.

Figure 1:
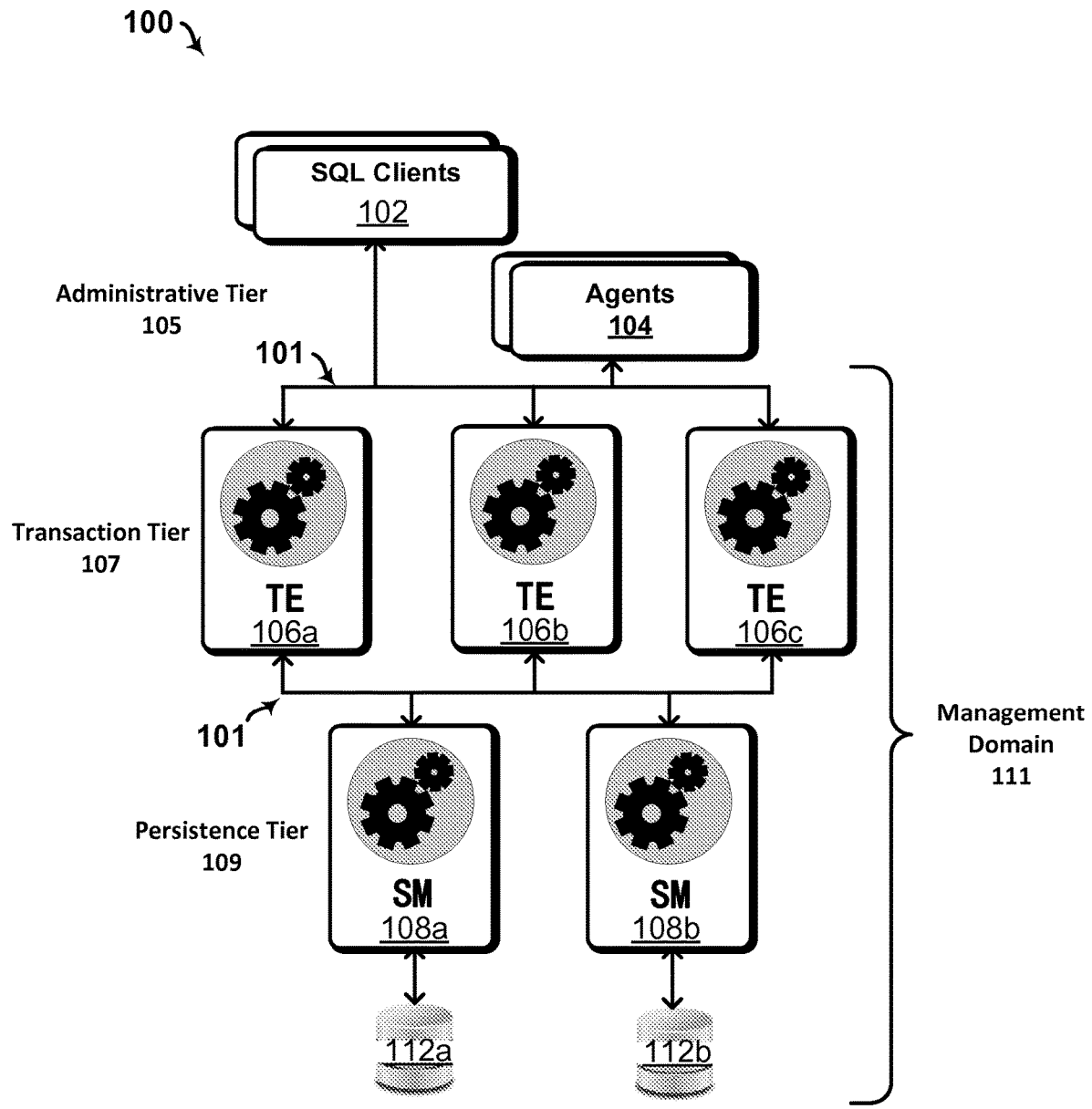
FIG. 1 schematically illustrates an example distributed database system that includes a plurality of interconnected nodes that are configured to store partitioned database tables.

These and other features of the present embodiments will be understood better by reading the following detailed description, taken together with the figures herein described. The accompanying drawings are not intended to be drawn to scale. In the drawings, each identical or nearly identical component that is illustrated in various figures is represented by a like numeral. For purposes of clarity, not every component may be labeled in every drawing.

DETAILED DESCRIPTION

Database table partitioning presents a number of non-trivial challenges within the context of distributed database systems. One existing approach to table partitioning in a distributed database system is through the use of a shared-nothing database, also referred to as a "sharded" database. In a sharded database, each database node services a database instance, also referred to as a "shard," that is essentially an autonomous database. This divide-and-conquer approach can be complex to implement and administer. For example, user applications accessing the database must be configured to understand which database node to access to perform each transaction. This is because each record to be added, updated, and/or removed is stored in a particular shard. For instance, shard A may be configured to store a first portion of records wherein partition key "gender" is "female", while shard B may be configured to store a second portion of records wherein partition key "gender" is "male". A user application must be configured to understand which node services shard A and which node services shard B so that, for example, read and write operations targeting records having the value "female" in column "gender" are performed against shard A. Distributed transactions that affect multiple shards (e.g., records in both shard A and shard B) require that a user application connect to each node servicing those shards and separately perform transactions thereon. Sharded databases therefore cannot guarantee that distributed transactions performed concurrently will be free of conflicts or other corrupt data. This represents a substantial impediment to the implementation of a robust table partitioning scheme in a distributed database.

In addition, modifications to shards, such as splitting, merging and migrating (e.g., moving a shard to a different node) require that user application code be adjusted to account for the location of new shards, and how records are divided amongst those new shards. For large databases having many nodes and many corresponding shards, it can take extended periods of time (e.g., days, weeks, or months) to complete such adjustment to user applications. Such modifications can also require that shards be taken offline until a modification is completed, which can be unacceptable in applications where data availability is important. Changes to table schema can also be complex for similar reasons, as each shard must be updated individually to add, remove, or update columns and associated indexes. So utilizing conventional approaches to table partitioning can result in database service interruption during such changes, and in some instances, can require expensive and time consuming reconfiguration of user applications before full database access can be restored. This is yet another reason why sharded databases represent a suboptimal way of partitioning a distributed database.

Thus, in an embodiment according to the present disclosure, a distributed database system implements a unified partitioning scheme allowing a table to be horizontally partitioned and those partitions stored on and serviced by a storage group. A storage group is a subset of storage manager (SM) nodes, and each SM node is configured to persist database data in durable storage. The distributed database system assigns each storage group to a subset of SM nodes. The distributed database system can address each storage group using a symbolic mapping that allows transactions to identify a particular storage group, and to direct read and write operations to a subset of SM nodes servicing that storage group. An administrator can update this mapping on-the-fly to cause the distributed database system to dynamically adjust an implemented partitioning scheme without necessarily interrupting on-going database operations. As will be appreciated in light of this disclosure, this departs from table partitioning implementations that statically define database locations to store and service table partitions.

In more detail, within the distributed database system, the implemented partitioning scheme is defined by one or more applied partitioning policies. Changes to these partitioning policies dynamically adjusts the implemented partitioning scheme during operation of the distributed database system. Such dynamic partitioning adjustments can include, for example, adding and removing table partitions serviced by a storage group, adjusting partition criteria to route read and write operations to a correct table partition based on partition keys, and adjusting storage group to SM node assignments.

In an embodiment, the assignment of a storage group to an SM node causes the distributed database system to synchronize database objects of that storage group to the SM node. That is, database objects associated with a particular table partition serviced by a storage group get stored in the SM node's durable storage. Note that a storage group can service multiple table partitions, and thus, an assignment of a storage group to an SM node causes such synchronization for each table partition serviced by that storage group. Further note, the distributed database system continues to accept read and write operations against a storage group during synchronization. For example, a previously synchronized SM node can continue to service requests until a new SM node is fully synchronized against the storage group. In addition, a partially-synchronized SM node can service query requests against what data is available. Write operations against a partially-synchronized SM node occur in-memory, as if the SM node is fully synchronized, with those changes being persisted to durable storage. This means that each SM maintains a consistent copy of each table partition during synchronization, even as additional database write operations occur. Unassigning a storage group from an SM node causes that SM node to remove database objects associated with one or more table partitions serviced by the storage group.

In an embodiment, the distributed database system enables database clients to "see" a single, contiguous instance of a table for the purposes of executing database read and write operations. This means database clients can execute transactions without knowledge of partition criteria, and without knowledge as to which SM nodes service those partitions. Such embodiments enable distributed transactions to be executed in a way that provide Atomicity, Consistency, Isolation and Durability (ACID) properties. Note that database read and write operations are not necessarily limited to structured query language (SQL) and other query formats and data modeling will be apparent in light of this disclosure. For example, the distributed database system can implement Resource Description Framework (RDF) data modeling and allow execution of RDF queries using, for instance, Simple Protocol and RDF Query Language (SPARQL).

In more detail, the relationship between storage group and SM nodes is defined by a mapping that the distributed database persists in durable storage. This mapping allows database clients to execute transactions without necessarily understanding the partitioning scheme implemented within the distributed database. Database clients transparently access data within table partitions through database nodes of a transaction tier, with those nodes allowing in-memory access to the database during execution of transactions. Nodes of the transaction tier can use the storage group mapping to determine what SM node to access in order to retrieve additional data, as needed. Whether a transaction is distributed or not (that is, whether it affects records in multiple partitions or in a single partition) is therefore irrelevant to a given database client, since that database client performs database read and write operations as if it was executing transactions on a single database table. The distributed database system can have any number of transaction engine (TE) nodes configured to execute queries on behalf of database clients and coordinate access to SM nodes. Numerous alternative configurations and modifications will be apparent in light of this disclosure.

A number of advantages are associated with certain aspects of the disclosed embodiments. For example, some implementations enable table partitions to be created, split, merged, and moved without those changes interrupting ongoing database read and write operations. In addition, such table partition changes can be performed without reconfiguring user applications because access to the table partitions is handled by the distributed database system rather than by user applications. Database users can also execute database transactions that create or update table partitioning policies, on-the-fly, with those new policies taking effect system-wide (e.g., replicated to all database nodes). These table partitioning policies can include criteria and a symbolic identifier of a storage group responsible for storing records that satisfy the criteria. Because table partitions are serviced by a storage group, SM nodes can be added to and removed from a given storage group in a manner that is transparent to users of the database. So, a storage group can be dynamically assigned to a SM and, in response, the SM can perform a synchronization routine that stores a complete copy of the table partition serviced by the storage group. Thus, an administrator can add additional SM nodes such that each table partition is stored in multiple storage locations. If one of those SM nodes fails, a table partition may continue to be serviced by other SM nodes in the same storage group, thus providing an additional degree of redundancy that existing systems lack.

System Architecture

FIG. 1 schematically illustrates an example distributed database system 100 that includes a plurality of interconnected nodes that are configured to store partitioned database tables, in accordance with an embodiment of the present disclosure. As shown in the example embodiment, the architecture of the distributed database system 100 includes a number of database nodes assigned to three logical tiers: an administrative tier 105, a transaction tier 107, and a persistence tier 109. The nodes comprising the distributed database system 100 are peer nodes that can communicate directly and securely with each other to coordinate ongoing database operations. So, as long as at least one database node is operational within each of the transaction tier 107 and the persistence tier 109, SQL clients 102 can connect and perform transactions against databases hosted within the distributed database system 100.

In more detail, the distributed database system 100 is an elastic database system comprising an arbitrary number of database nodes (e.g., nodes 106a-106c, 108a-b) executed on an arbitrary number of host computers (not shown). For example, database nodes can be added and removed at any point on-the-fly, with the distributed database system 100 using newly added nodes to "scale out" or otherwise increase database performance and transactional throughput. As will be appreciated in light of this disclosure, the distributed database system 100 departs from conventional database approaches that tightly couple on-disk representations of data (e.g., pages) with in-memory structures. Instead, certain embodiments disclosed herein advantageously provide a memory-centric database wherein each peer node implements a memory cache in volatile memory, such as random access memory (RAM), that can be utilized to keep active portions of the database cached for efficient updates during ongoing transactions. In addition, database nodes of the persistence tier 109 can implement storage interfaces that can commit those in-memory updates to physical storage devices to make those changes durable (e.g., such that they survive events such as reboots, power losses, and application crashes). Such a combination of distributed memory caches and durable storage interfaces is generally referred to herein as a durable distributed cache (DDC).

In an embodiment, database nodes can request portions of the database residing in a peer node's cache memory, if available, to avoid the expense of disk reads to retrieve portions of the database from durable storage. Examples of durable storage that can be used in this regard include a hard drive, a network attached storage (NAS) device, a redundant array of independent disks (RAID), and any other suitable storage device. As will be appreciated in light of this disclosure, the distributed database system 100 enables the SQL clients 102 to view what appears to be a single, logical database with no single point of failure, and perform transactions that advantageously keep in-use portions of the database in cache memory (e.g., volatile RAM) while providing ACID properties.

The SQL clients 102 can be implemented as, for example, any application or process that is configured to construct and execute SQL queries. For instance, the SQL clients 102 can be user applications implementing various database drivers and/or adapters including, for example, Java database connectivity (JDBC), open source database connectivity (ODBC), PHP data objects (PDO), or any other database driver that is configured to communicate and utilize data from a relational database. As discussed above, the SQL clients 102 can view the distributed database system 100 as a single, logical database. To this end, the SQL clients 102 address what appears to be a single database host (e.g., utilizing a single hostname or internet protocol (IP) address), without regard for how many database nodes comprise the distributed database system 100.

Within the transaction tier 107 a plurality of TE nodes 106a-106c is shown. The transaction tier 107 can comprise more or fewer TE nodes, depending on the application, and the number shown should not be viewed as limiting the present disclosure. As discussed further below, each TE node can accept SQL client connections from the SQL clients 102 and concurrently perform transactions against the database within the distributed database system 100. In principle, the SQL clients 102 can access any of the TE nodes to perform database queries and transactions. However, and as discussed below, the SQL clients 102 can advantageously select those TE nodes that provide a low latency connection through an admin node running as a "connection broker", as will be described in turn.

Within the persistence tier 109 SM nodes 108a and 108b are shown. In an embodiment, each of the SM nodes 108a and 108b can include a full copy of the database, or portions thereof depending on applied partitioning policies, within a corresponding durable storage location 112a and 112b, respectively. As discussed below, database objects can be represented by atoms, and thus, a full copy of the database can refer to a complete collection of those atoms. Also as discussed below with regard to FIG. 5, storage group assignments are flexible and dynamic to accommodate database operational requirements. For example, an SM node can service all storage groups, or a minimum set of reserved storage groups, or a mix of user-defined storage groups, or any combination thereof. The reserved storage group, also known as an "unpartitioned" storage group, include system-related atoms. These system-related atoms allow an SM node to startup and initiate normal operation (e.g., a catalog atom). As a result, the reserved storage group can be serviced by each SM node. This storage group also contains system tables and unpartitioned user tables. The user-defined storage groups can be defined by a user for use with table partitioning techniques as variously disclosed herein. User-defined storage groups contain, for example, table atoms, catalog atoms, record atoms, data atoms, blob atoms, and index atoms for one or more table partitions.

Numerous additional embodiments will be apparent in light of this disclosure. In an embodiment, the durable storage locations 112a and 112b can be local (e.g., within the same host computer) to the SM nodes 108a and 108b. For example, the durable storage locations 112a and 112b can be implemented as a physical storage device such as a spinning hard drive, a solid state hard drive, or a RAID comprising a plurality of physical storage devices. In other cases, the durable storage locations 112a and 112b can be implemented as, for example, network locations (e.g., NAS) or other suitable remote storage devices and/or appliances, as will be apparent in light of this disclosure.

Figure 10:
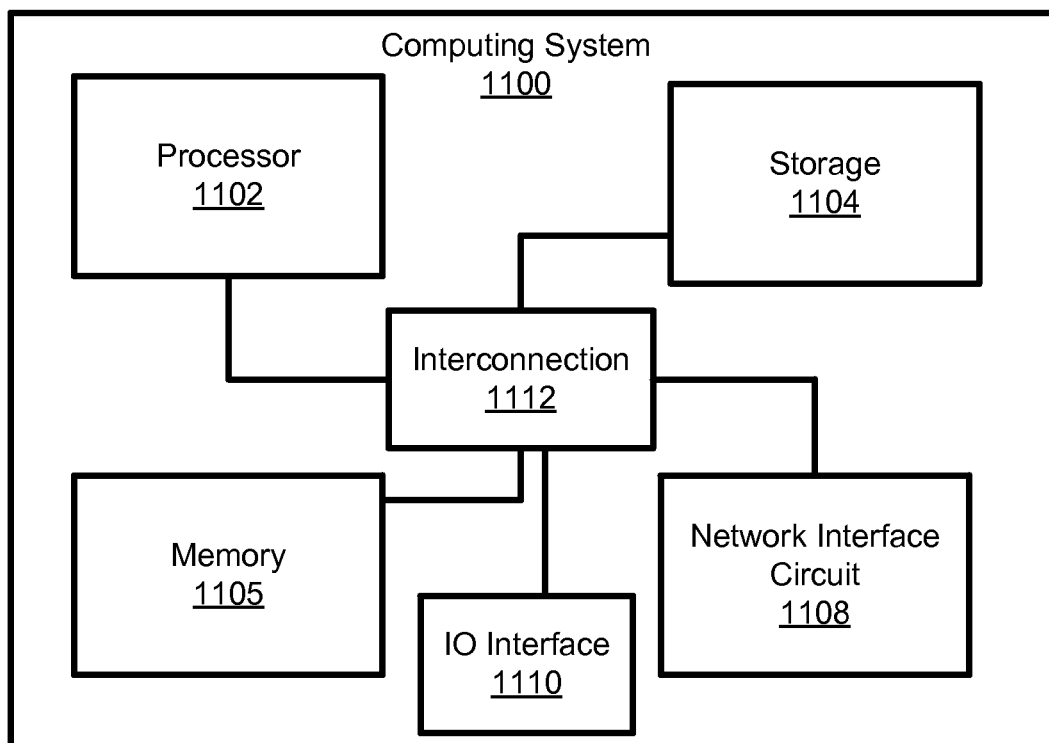
FIG. 10 schematically illustrates the architecture of a computing system that is configured in accordance with an example embodiment.

In an embodiment, each database node (TE nodes 106a-106c, SM nodes 108a-b) of the distributed database system 100 can comprise a computer program product including machine-readable instructions compiled from C, C++, Java, Python or other suitable programming languages. These instructions may be stored on a non-transitory computer-readable medium, such as in a memory of a given host computer, and when executed cause a given database node instance to be instantiated and executed. As discussed below, an admin node can cause such instantiation and execution of database nodes by causing a processor to execute instructions corresponding to a given database node. FIG. 10 schematically illustrates the architecture of one such computing system 1100 capable of instantiating and executing database nodes of the distributed database system 100.

In an embodiment, the database nodes of each of the administrative tier 105, the transaction tier 107, and the persistence tier 109 are communicatively coupled through one or more communication networks 101. In an embodiment, such communication networks 101 can be implemented as, for example, a physical or wireless communication network that enables data exchanges (e.g., packets) between two points (e.g., nodes running on a host computer) utilizing one or more data transport protocols. Some such example protocols include transmission control protocol (TCP), user datagram protocol (UDP), shared memory, pipes or any other suitable communication means that will be apparent in light of this disclosure. In some cases, the SQL clients 102 access the various database nodes of the distributed database system 100 through a wide area network (WAN) facing IP address. In addition, as each database node within the distributed database system 100 could be located virtually anywhere where there is network connectivity, encrypted point-to-point connections (e.g., a virtual private network (VPN)) or other suitable secure connection types may be established between database nodes.

Management Domains

As shown, the administrative tier 105 includes admin nodes 104 that are configured to manage database configurations, and are executed on computer systems that will host database resources. Thus, and in accordance with an embodiment, the execution of an admin node 104 is a provisioning step that both makes the host computer available to run database nodes, and makes the host computer visible to distributed database system 100. A collection of these provisioned host computers is generally referred to herein as a management domain. Each management domain is a logical boundary that defines a pool of resources available to run databases, and contains permissions for users to manage or otherwise access those database resources. For instance, and as shown in FIG. 1, the distributed database system 100 includes one such management domain 111 that encompasses the database nodes of the distributed database system 100, and the one or more respective host computers (not shown) executing those database nodes.

For a given management domain, an admin node running on each of the host computers is responsible for starting and stopping a database, monitoring those nodes and the host computer's resources, and performing other host-local tasks. In addition, each admin node enables new database nodes to be executed to, for example, increase transaction throughput and/or increase the number of storage locations available within the distributed database system 100. This enables the distributed database system 100 to be elastic as new host computers and/or database nodes can be added in an on-demand manner to meet changing database demands. For example, database nodes can be added on-the-fly while the database is running (e.g., during ongoing database operations), and those database nodes can automatically authenticate with their peer nodes in order to perform secure point-to-point communication within the management domain 111.

In an embodiment, one or more of the admin nodes 104 can be further configured to operate as a connection broker. The connection broker role enables a global view of all agents in a management domain, and thus all nodes, databases and events (e.g., diagnostic, error related, informational) therein. In addition, the connection broker role enables load-balancing between the SQL clients 102 and the TE nodes 106a-106c. For example, the SQL clients 102 can connect to a particular admin node configured as a connection broker to receive an identifier of a TE (e.g., an IP address, host name, alias, or logical identifier) that can service connections and execute transactions with a relatively low latency compared to other TE nodes. In an embodiment, load-balancing policies are configurable, and can be utilized to optimize connectivity based on factors such as resource utilization and/or locality (e.g., with a preference for those TE nodes geographically closest to a SQL client, or those TE nodes with the fastest response time).

Transaction Engine Architecture

Figure 2A:
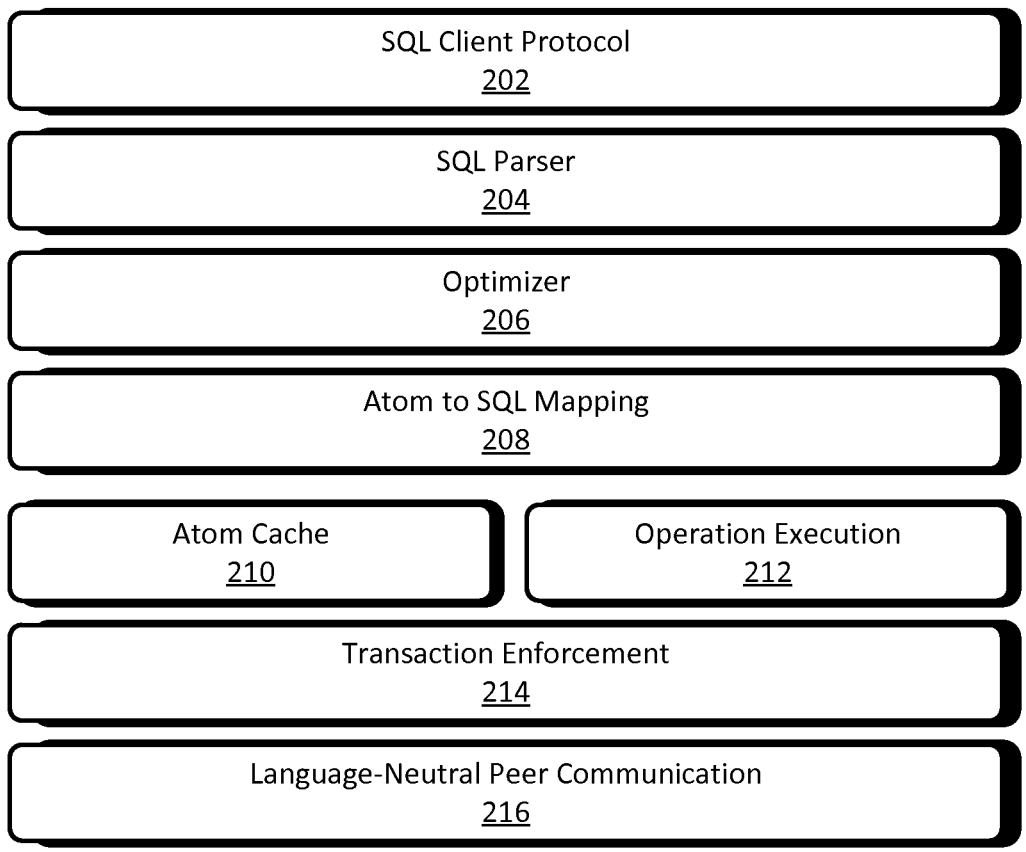
FIG. 2a schematically illustrates the architecture of an example transaction engine that forms part of the distributed database system of FIG. 1.

FIG. 2a depicts an example of the architecture 200 of the TE nodes (e.g., TE nodes 106a-106c) within the distributed database system 100, in accordance with an embodiment of the present disclosure. As discussed above, TE nodes are client-facing database nodes that accept connections from the SQL clients 102 and enable a single, logical view of a database across a plurality of database nodes within the management domain 111. Accordingly, and as shown, the TE architecture 200 includes a SQL client protocol module 202. In an embodiment, the SQL client protocol module 202 can be configured to host remote connections (e.g., through UDP/TCP) and receive packets (or data structures via shared memory/pipes) from SQL clients 102 to execute SQL transactions. The SQL parser module 204 is configured to receive the SQL transactions from the remote connections, and parse those queries to perform various functions including, for example, validating syntax and semantics, determining whether adequate permissions exist to execute the statements, and allocating memory and other resources dedicated to the query. In some cases, a transaction can comprise a single operation such as "SELECT," "UPDATE," "INSERT," and "DELETE," just to name a few. In other cases, each transaction can comprise a number of such operations affecting multiple objects within a database. In these cases, and as will be discussed further below, the distributed database system 100 enables a coordinated approach such that these transactions are consistent and do not result in errors, or other database corruption, caused by concurrent transactions updating the same portions of a database (e.g., performing writes on a same record or other database object simultaneously).

In an embodiment, an optimizer 206 can be configured to determine a preferred way of executing a given query. To this end, the optimizer 206 can utilize indexes, clusters, table relationships, and table partitioning policies configured to avoid expensive full-table scans by using portions of the database within cache memory when possible. As will be discussed further below, the optimizer 206 can be utilized to "prune" database partitions such that only those database partitions affected by a given query are utilized during searches. In addition, in the event a full-table scan is necessary, the optimizer 206 can perform such scans on table partitions, versus an entire database table, to increase query performance. Numerous additional performance enhancements will be apparent in light of this disclosure. For example, the distributed database system 100 can include parallel processing schemes that optimize execution of database queries against multiple table partitions.

As shown, the example TE architecture 200 includes an atom to SQL mapping module 208. The atom to SQL mapping module 208 can be utilized to locate atoms that correspond to portions of the database that are relevant or otherwise affected by a particular transaction being performed. As generally referred to herein, the term "atom" refers to a flexible data object or structure that can contain a current version and a number of historical versions for a particular type of database object (e.g., schema, tables, records, data, blobs, and indexes). Within TE nodes, atoms generally exist in non-persistent memory, such as in an atom cache 210, and can be serialized and de-serialized, as appropriate, to facilitate communication of atoms between database nodes. As will be discussed further below with regard to FIG. 2b, atom updates can be committed to durable storage by SM nodes. So, atoms can be marshalled or un-marshaled by SM nodes utilizing durable storage to service requests for those atoms.

Atoms are chunks of data that can represent database objects, but are operationally distinct from conventional pages in a relational database. For example, atoms are, in a sense, peers within the distributed database system 100 that can coordinate between their instances in each atom cache 210 during marshalling or un-marshalling by the SM nodes. For example, in addition to representing database objects, in some embodiments atoms can also represent a catalog which can be utilized to resolve other atoms. Thus a catalog can operate as a distributed and bootstrapping lookup service. In such implementations, when a TE node starts up, it acquires an atom that represents a catalog. This catalog can be considered a root atom from which other atoms can be found. In general, atoms link to other atoms, and form chains or associations that can be used to reconstruct database objects stored in one or more atoms. For example, the root atom can be utilized to reconstruct a query table by locating a particular table atom. In turn, the table atom can reference other related atoms such as index atoms, record atoms, and data atoms. So, the catalog enables each atom to be found within the DDC of the distributed database system 100, and thus provides a bootstrapping mechanism that makes it efficient to bring new TE nodes online.

In an embodiment, each TE is responsible for mapping SQL content to corresponding atoms. As generally referred to herein, SQL content comprises database objects such as, for example, tables, indexes and records that may be represented within atoms. In this embodiment, a catalog may be utilized to locate the atoms which are used to perform a given transaction within the distributed database system 100. Likewise, the optimizer 206 can also utilize such mapping to determine atoms that may be available in the atom cache 210.

Although TE nodes are described herein as comprising SQL-specific modules 202-208, such modules can be understood as plug-and-play translation layers that can be replaced with other non-SQL modules having a different dialect or programming language. As will be appreciated in light of this disclosure, ACID properties are enforced at the atom-level, which enables the distributed database system to execute other non-SQL type concurrent data manipulations while still providing ACID properties.

Continuing with FIG. 2a, the TE architecture 200 includes an atom cache 210. As discussed above with regard to FIG. 1, the atom cache 210 is part of the DDC implemented within the distributed database system 100. To this end, and in accordance with an embodiment of the present disclosure, the atom cache 210 hosts a private memory space in RAM accessible by a given TE. The size of the atom cache can be user-configurable or sized to utilize all available memory space on a host computer, depending upon a desired configuration. As discussed above, when a TE first executes, the atom cache 210 is populated with one or more atoms representing a catalog. In an embodiment, the TE utilizes this catalog to satisfy executed transactions, and in particular, to identify and request the atoms within the atom caches of other peer nodes (including peer TE nodes and SM nodes). If an atom is unavailable in an atom cache, a request can be sent to an SM within the distributed database system 100 to retrieve the atom from durable storage and thus make the requested atom available. Thus the atom cache 210 is an on-demand cache, wherein atoms can be copied from one atom cache to another, as needed. It should be further appreciated that the on-demand nature of the atom cache 210 enables various performance enhancements since a given TE can quickly and efficiently be brought online without the necessity of retrieving a large number of atoms.

Still continuing with FIG. 2a, the TE architecture 200 includes an operation execution module 212. The operation execution module 212 can be utilized to perform in-memory updates to atoms (e.g., data manipulations) within the atom cache 210 based on a given transaction. Once the operation execution module 212 has performed various in-memory updates to atoms, a transaction enforcement module 214 ensures that changes occurring within the context of a given transaction are performed in a manner that provides ACID properties. As discussed above, concurrently-executed transactions can potentially alter the same portions of a database during execution.

By way of illustration, consider the sequence of events that occurs when money is moved between bank accounts represented by tables and data in a database. During one such example transaction, a subtraction operation decrements money from one record in the database and then adds the amount decremented to another record. This example transaction is then finalized by a commit operation that makes those record changes "durable" or otherwise permanent by storing them in non-volatile memory. Non-volatile memory includes, for example, a hard drive, flash memory, other device that retains data even after reboots or loss of power. Now consider if two such transactions are concurrently performed that manipulate data in same portions of the database. Without careful consideration of this circumstance, each transaction could fail before fully completing, or otherwise cause an inconsistency within the database (e.g., money subtracted from one account but not credited to another, incorrect amount debited or added to an account, and other unexpected and undesirable outcomes). This is so because one transaction could alter or otherwise manipulate data causing the other transaction to "see" an invalid or intermediate state of that data. To avoid such isolation and consistency violations in the face of concurrent transactions, and in accordance with an embodiment of the present disclosure, the distributed database system 100 applies ACID properties. These properties can be applied not at a table or row level, but at an atom-level. To this end, concurrency is addressed in a generic way without the distributed database system 100 having specific knowledge that atoms contain SQL structures. Application of the ACID properties within the context of the distributed database system 100 will now be discussed in turn.

Atomicity refers to transactions being completed in a so-called "all or nothing" manner such that if a transaction fails, a database state is left unchanged. Consequently, transactions are indivisible ("atomic") and fully complete, or fully fail, but never perform partially. This is important in the context of the distributed database 100, where a transaction not only affects atoms within the atom cache of a given TE processing the transaction, but all database nodes having a copy of those atoms as well. As will be discussed below, changes to atoms can be communicated in an asynchronous manner to each database process, with those nodes finalizing updates to their respective atom copies only after the transaction enforcement module 214 of the TE processing the transaction broadcasts a commit message to all interested database nodes. This also provides consistency, since only valid data is committed to the database when atom updates are finally committed. In addition, isolation is achieved as concurrently executed transactions do not "see" versions of data that are incomplete or otherwise in an intermediate state of change. As discussed further below, durability is provided by SM nodes, which also receive atom updates during transaction processing by TE nodes, and finalize those updates to durable storage (e.g., by serializing atoms to a physical storage location) before acknowledging a commit. In accordance with an embodiment, an SM node may journal changes efficiently before acknowledging a commit, and then serialize atoms to durable storage periodically in batches (e.g., utilizing lazy-write).

Figure 3:
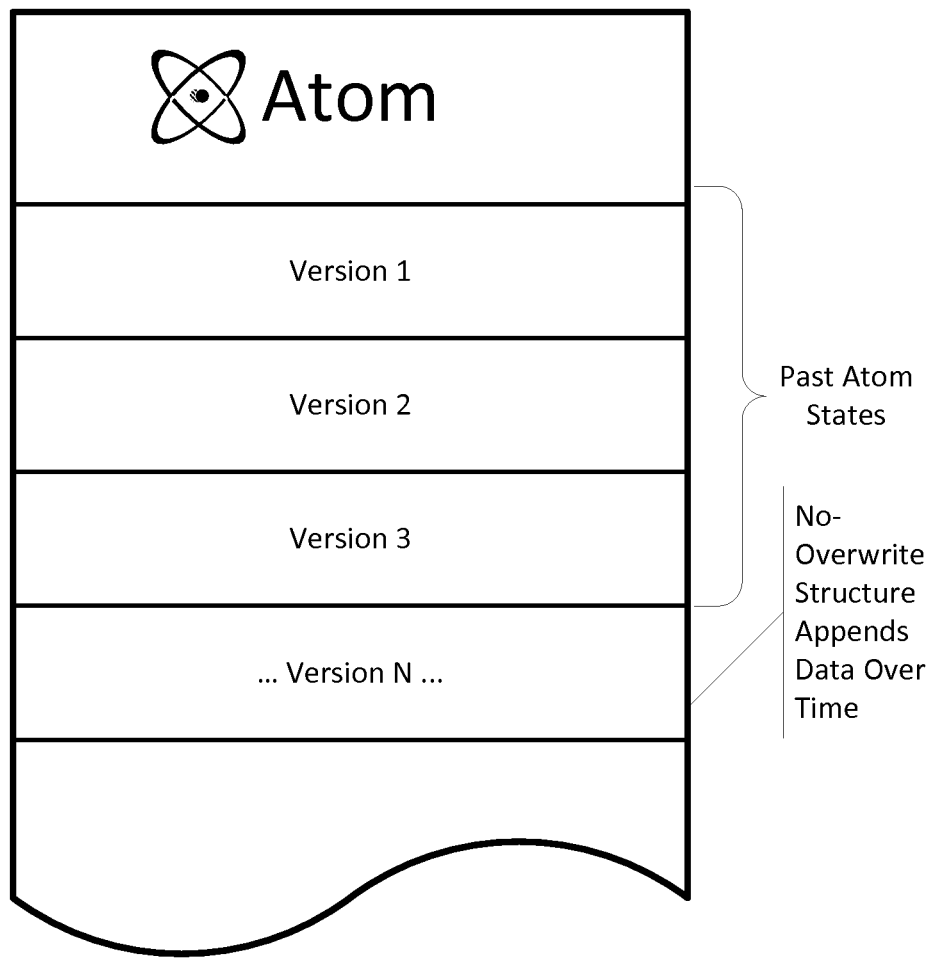
FIG. 3 is a block diagram illustrating an example atom having a no-overwrite structure.

To comply with ACID properties, and to mitigate undesirable delays due to locks during write operations, the transaction enforcement module 214 can be configured to utilize multi-version concurrency control (MVCC). In an embodiment, the transaction enforcement module 214 implements MVCC by allowing several versions of data to exist in a given database simultaneously. Therefore, an atom cache (and durable storage) can hold multiple versions of any given atom. In particular, and with reference to the example atom structure shown in FIG. 3, atoms are objects that can contain a canonical (current) version and a predefined number of pending or otherwise historical versions that may be used by current transactions. To this end, atom versioning is accomplished with respect to record versions within atoms, and not atoms themselves. Note, a version is considered pending until a corresponding transaction successfully commits. So, the structure and function of atoms enable separate versions to be held in-cache so that no changes occur in-place (e.g., in durable storage); rather, updates can be communicated in a so-called "optimistic" manner as a rollback can be performed by dropping a pending update from an atom cache. In an embodiment, the updates to all interested database nodes that have a copy of the same atom in their respective atom cache (or durable storage) can be communicated asynchronously (e.g., via a communication network), and thus, allow a transaction to proceed with the assumption that it will commit successfully.

Continuing with FIG. 2a, the example TE architecture 200 includes a language-neutral peer communication module 216. In an embodiment, the language-neutral peer communication module 216 is configured to send and receive low-level messages amongst peer nodes within the distributed database system 100. These messages are responsible for, among other things, requesting atoms, broadcasting replication messages, committing transactions, and other database-related messages. As generally referred to herein, language-neutral denotes a generic textual or binary-based protocol that can be utilized between database nodes that is not necessarily SQL. To this end, while the SQL client protocol module 202 is configured to receive SQL-based messages via communication network 101, the protocol utilized between agents, TE nodes, and SM nodes using the communication network 101 can be a different protocol and format, as will be apparent in light of this disclosure.

Storage Manager Architecture

Figure 2B:
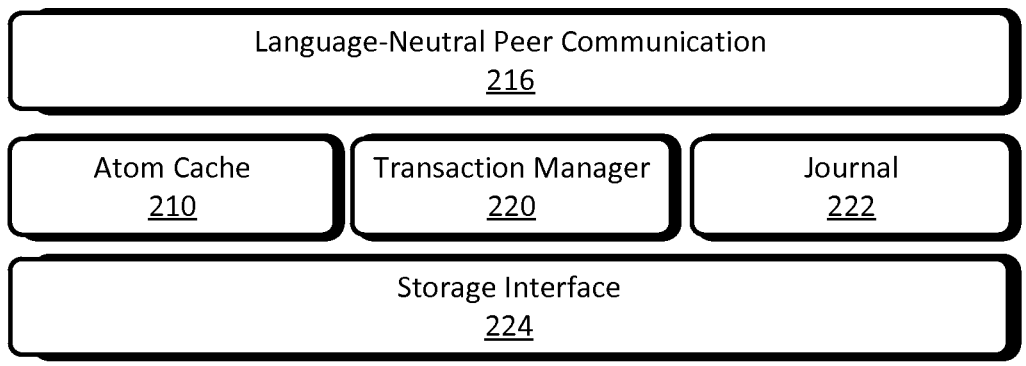
FIG. 2b schematically illustrates the architecture of an example storage manager that forms part of the distributed database system of FIG. 1.

FIG. 2b depicts one example of the architecture 201 of the SM nodes (e.g., SM nodes 108a-b) within the distributed database system 100, in accordance with an embodiment of the present disclosure. In an embodiment, each SM is configured to address its own full copy (e.g., a complete set of atoms) of a database within the distributed database system 100. Alternatively, or in addition to a fully copy of a database, an SM can also service a subset of atoms in the database via one or more storage groups. Thus, an SM's full copy of the database can service all storage groups. As discussed above, each database within the distributed database system 100 persists essentially as a plurality of atom objects (e.g., versus pages or other memory-aligned structures). Recall that ACID requires durability of data such that once a transaction has been committed, that data permanently persists in storage until otherwise affirmatively removed. Thus to ensure the Durability property of ACID, SM nodes can store atom updates to physical storage once transactions are committed. Note, however, that an SM node can also store atom updates to persistent storage before a given transaction commits. These pre-commit changes (e.g., newly versioned records) state the transaction associated with the change. The transaction state and visibility rules allow the distributed database system 100 to comply with the ACID properties. If the transaction is rolled back instead of committed, the distributed database system 100 can backout the versioned record and data associated with rolled back transaction.

In more detail, the SM nodes receive atom updates from TE nodes (e.g., TE nodes 106a-106c) performing transactions, and commit those transactions in a manner that utilizes, for example, MVCC as discussed above with regard to FIG. 2a. So, as will be apparent in light of this disclosure, SM nodes function similarly to TE nodes as they can perform in-memory updates of atoms within their respective local atom caches; however, SM nodes eventually write such modified atoms to durable storage. In addition, each SM can be configured to receive and service atom request messages from peer database nodes within the distributed database system 100.

In some cases, atom requests can be serviced by returning requested atoms from the atom cache of an SM. However, and in accordance with an embodiment, a requested atom may not be available in a given SM atom cache. Such circumstances are generally referred to herein as "misses" as there is a slight performance penalty because durable storage must be accessed by an SM to retrieve those atoms, load them into the local atom cache, and provide those atoms to the database node requesting those atoms. For example, a miss can be experienced by a TE when it attempts to access an atom in its respective cache and that atom is not present. In this example, a TE responds to a miss by requesting that missing atom from another peer node (e.g., TE or an SM). In contrast, an SM responds to a miss by requesting that missing atom from another peer node (e.g., a TE or an SM), or by loading that missing atom from durable storage if no peer nodes have the atom cached in their respective atom cache. To this end, a node incurs some performance penalty for a miss. Note that in some cases there may be two misses. For instance, a TE may miss and request an atom from an SM, and in turn, the SM may miss (e.g., the requested atom is not in the SM atom cache) and load the requested atom from disk.

As shown, the example SM architecture 201 includes modules that are similar to those described above with regard to the example TE architecture 200 of FIG. 2a (e.g., the language-neutral peer communication module 216, and the atom cache 210). It should be appreciated that these shared modules are adaptable to the demands of the particular logical tier to which a node belongs, and thus, can be utilized in a generic or so-called "plug-and-play" fashion by both transactional nodes (e.g., TE nodes) and persistence-related database nodes (e.g., SM nodes). However, and in accordance with the shown embodiment, the example SM architecture also includes additional persistence-centric modules including a transaction manager module 220, a journal module 222, and a storage interface 224. Each of these persistence-centric modules will now be discussed in turn.

As discussed above, an SM node is responsible for addressing a full copy of a database within the distributed database system 100. To this end, the SM receives atom updates during transactions occurring on one or more TE nodes (e.g., TE nodes 106a-106c) and is tasked with ensuring that the updates in a commit are made durable prior to acknowledging that commit to a TE, assuming that transaction successfully completes. Within the context of the example SM architecture 201, this is enabled by the transaction manager module 220 enforcing a partial order on committed transactions in which they are made durable in the order they are committed at each TE node. As all database-related data is represented by atoms, so too are transactions within the distributed database system 100, in accordance with an embodiment. To this end, the transaction manager module 220 can store transaction atoms within durable storage. As will be appreciated, this enables SM nodes to logically store multiple versions of data-related atoms (e.g., record atoms, data atoms, blob atoms) and perform so-called "visibility" routines to determine the current version of data that is visible within a particular atom, and consequently, an overall current database state that is visible to a transaction performed on a TE. In addition, and in accordance with an embodiment, the journal module 222 enables atom updates to be journaled to enforce durability of the SM. The journal module 222 can be implemented as an append-only set of diffs that enable changes to be written efficiently to the journal.

As shown, the example SM architecture 201 also includes a storage interface module 224. The storage interface module 224 enables an SM to write and read from physical (durable) storage that is either local or remote to the SM. While the exact type of storage (e.g., local hard drive, RAID, NAS storage, cloud storage) is not particularly relevant to this disclosure, it should be appreciated that each SM within the distributed database system 100 can utilize a different storage service. For instance, a first SM node (e.g., SM 108a) can utilize, for example, a remote Amazon Elastic Block Storage (EBS) volume while a second SM node (e.g., SM node 108b) can utilize, for example, an Amazon S3 service. Thus, such mixed-mode storage can provide two or more storage locations with one favoring performance over durability, and vice-versa. To this end, and in accordance with an embodiment, TE nodes and SM nodes can run cost functions to track responsiveness of their peer nodes. In this embodiment, when a node needs an atom from durable storage (e.g., due to a "miss") the latencies related to durable storage access can be one of the factors when determining which SM to utilize to service a request.

Figure 4:
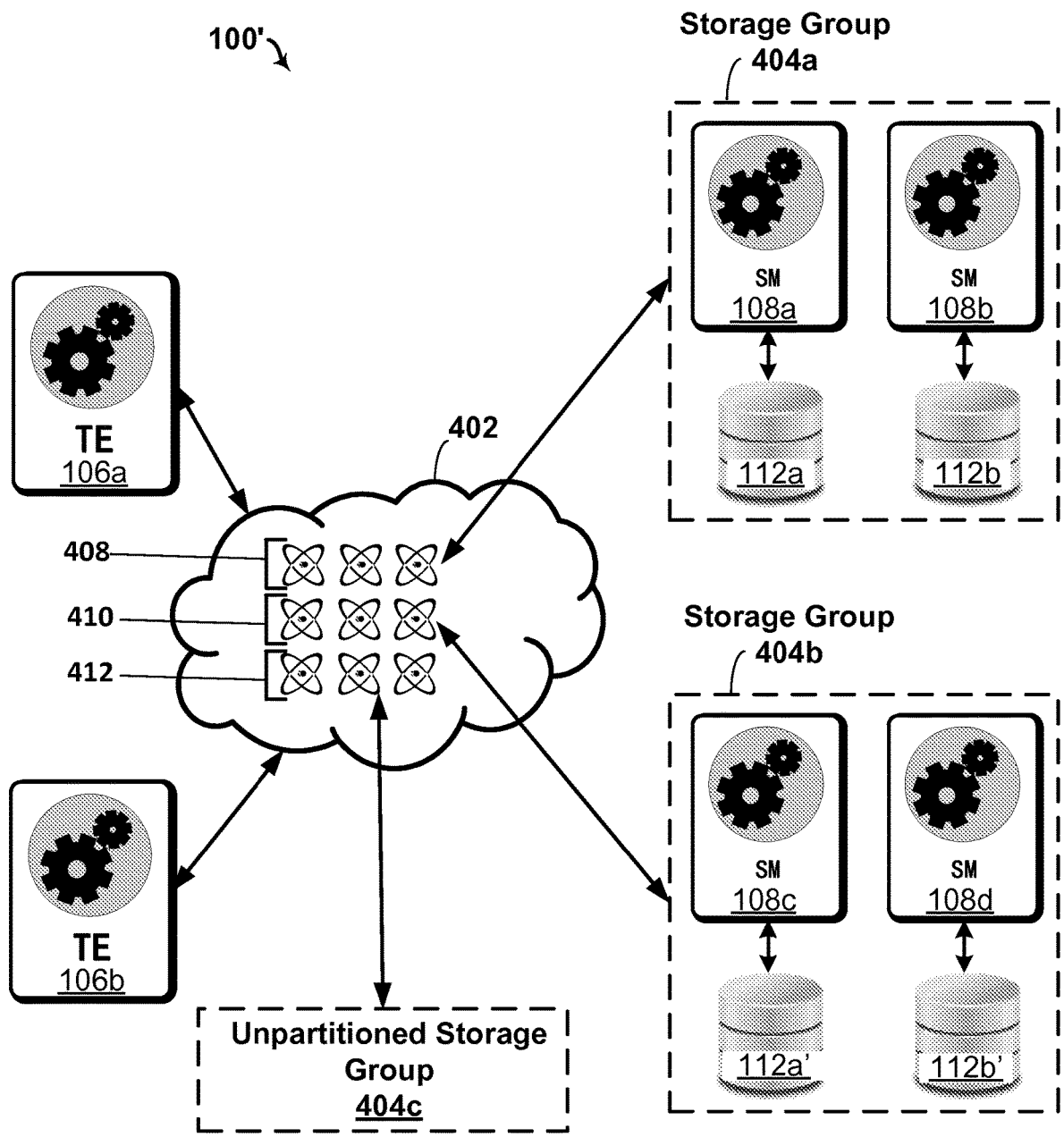
FIG. 4 schematically illustrates an example distributed database system wherein plurality of atoms are stored within respective storage groups.

Now referring to FIG. 4, a block diagram schematically illustrates an example embodiment 100' of the distributed database system 100 of FIG. 1, wherein a first plurality of atoms 408 are stored within a first storage group 404a, and a second plurality of atoms 410 are stored within a second storage group 404b. The example embodiment 100' shown in FIG. 4 is an abbreviated view of the distributed database system 100, and to this end, nodes such as the SQL clients 102, the admin nodes 104 and TE node 106c have been excluded for clarity. In addition, the distributed database system 100 can include any number of storage groups, and SM nodes servicing those groups, and thus the particular embodiment shown should not be construed as limiting in this regard. Likewise, each SM node can belong to any number of storage groups, although the example embodiment in FIG. 4 depicts a one-to-one relationship between SM nodes and respective storage groups.

As discussed above with regard to FIGS. 1, 2a and 2b, each database node owns or otherwise manages an atom cache 210 (in RAM) that is a component part of the collective DDC within the distributed database system 100. Thus the DDC 402 is a flexible cache that enables clients (e.g., SQL clients 102) to "see" a single, logical database, regardless of how atoms are distributed among the nodes of the distributed database system 100. By way of contrast, consider a context in which the distributed database 100 does not have table partitioning policies enabled. In this context, each SM node (e.g., SM nodes 108a and 108b) within a given management domain (e.g., management domain 111) will store a full copy of the database. This means that each SM node will have a copy of every database atom within its durable storage. However, with partitioning policies enabled on one or more tables, a given atom will only be stored on a subset of the SM nodes based on table partitioning policies. The distribution of atoms within the context of a partitioned-enabled database table will now be discussed.

As shown in FIG. 4, a first plurality of atoms 408 represent a portion of database atoms and correspond to one or more table partitions that are stored in durable storage only within SM nodes 108a and 108b of storage group 404a (durable storage 112a and 112b, respectively). Also shown is a second plurality of atoms 410 that correspond to one or more table partitions that are stored in durable storage only within SM nodes 108c and 108d of storage group 404b (durable storage 112a' and 112b', respectively).

This arrangement enables a single table to have multiple partitions, with each of those partitions assigned to different storage groups. By way of illustration, consider a circumstance where the storage group 404a is physically located in a geographic location that is different from that of the storage group 404b. This enables records within the table to reside in a physical location that is, for example, based on legal requirements for that data. Some such example legal requirements can include laws specific to a region that restrict where certain data (e.g., identity information, medical records, financial records, and other sensitive data) can be stored or not be stored, as the case may be. Even without a particular legal requirement, it may still be advantageous to distribute tables through partitioning. For instance, consider a horizontally partitioned table storing records associated with customers located in the United States and Europe. Records associated with United States customers can be partitioned and stored in a first storage group that is physically located in the United States, thus enabling SQL clients in the United States to have low-latency access to their data. Likewise, records associated with European customers can be partitioned and stored in a second storage group that is physically located in Europe, thus enabling SQL in Europe to also have low-latency access to their data.

In another example, a single table can have multiple partitions, with each of those partitions assigned to a common storage group. In this example, a large table can be divided into manageable chunks such that query optimization, also known as partition pruning. To this end, during query execution the optimizer 206 can ignore large portions of a table that may not be relevant to a query. This can help avoid the expense of having to do a full table scan when, for example, an index may not be available. Query optimization can further include the optimizer 206 advantageously choosing indexes that incorporate a given table's partitioning column(s), thereby avoiding the overhead of scanning portions of the index that are known not to contain any relevant results. For example, by including the partition key in the index of a column, the optimizer 206 can prune the partitions that do not contain any relevant data for the query by using the partition key in the index. Since the partition elimination is executed before the index scan, the scan does not have to iterate over the indexes (or records) in the eliminated partitions.

Regardless of how atoms are distributed based on partitioning policies, the distributed database system 100 can enable partitioned tables to be queried by SQL clients 102, with those clients viewing what appears to be one contiguous table. Stated differently, the SQL clients 102 are provided a logical view of a database table, with that table's constituent partitions being potentially stored by N number of storage groups. This means that TE nodes can execute transactions that affect all table partitions or a subset of partitions, or both. For example, a given transaction may execute a query that traverses the entirety of a first table, and by extension all of its respective table partitions, and also reads merely a portion of another table such that only a subset of its respective table partitions get traversed. So, the SQL clients 102 request such transactions without necessarily understanding the partitioning policies implemented by the distributed database system 100, and instead can operate what appears to be a single, logical view of each table.

Note that in some cases a storage group can fail or otherwise get shutdown (e.g., by an administrator). More particularly, if each SM node servicing a storage group fails or are shutdown, the storage group will transition into an unavailable state. A user interface hosted by an admin node may indicate this transition visually through an alert such as a text message, sound (e.g., a beep), audible message (e.g., "Storage group X unavailable, all SM nodes in error state"), or other notification. Queries against partitions that are mapped to the unavailable storage group can timeout and fail. Once at least one SM node servicing this storage group is brought back online, the storage group can transition back into the available state. The user interface hosted by an admin node may also indicate this transition through an alert such a text message, sound, or audible message.

In an embodiment, the DDC 402 can comprise additional atoms 412 that are stored within an unpartitioned storage group 404c. An unpartitioned storage group, as generally referred to herein, refers to a storage group that is serviced by all SM nodes within the distributed database system. The distributed database system 100 can use the unpartitioned storage group 404c to persist system-level tables, catalogues, or other data that is desirable to store on all SM nodes. The distributed database system 100 may designate unpartitioned storage group 404 as the default storage group for the system. This means that newly created tables get stored in the unpartitioned storage group 404c unless the DDL creating that table specifies a different location.

In an embodiment, storage groups are referenced by symbolic identifiers within the distributed database system 100. Symbolic binding can comprise a character string, integer or other value that can uniquely identify a particular storage group within the distributed database system. As discussed below, these symbolic identifiers provide a flexible mechanism by which partitioning policies can define partitioning criteria to establish a particular table partition, and also what subset of SMs are responsible for servicing that table partition. Stated differently, these symbolic identifiers enable partitioning policies to reference a symbolic name, as opposed to a static storage location (e.g., a drive letter, a relative path, and a file name), thus enabling dynamic adjustments to storage group assignments on-the-fly. One particular example of how partitioning policies can be used to map table partitions to storage groups is discussed below with regard to FIG. 5.

So, symbolic identifiers can be created, modified, and/or deleted during operation of the distributed database system 100. These changes can cause the distributed database system 100 to automatically synchronize a storage group to SM node(s) when that storage group is assigned, or to desynchronize a storage group if that storage group is unassigned from SM node(s). Synchronization, as generally referred to herein, refers to a process that copies or removes atoms of a storage group. One specific example of such synchronization is discussed below with regard to FIG. 9a.

Figure 5:
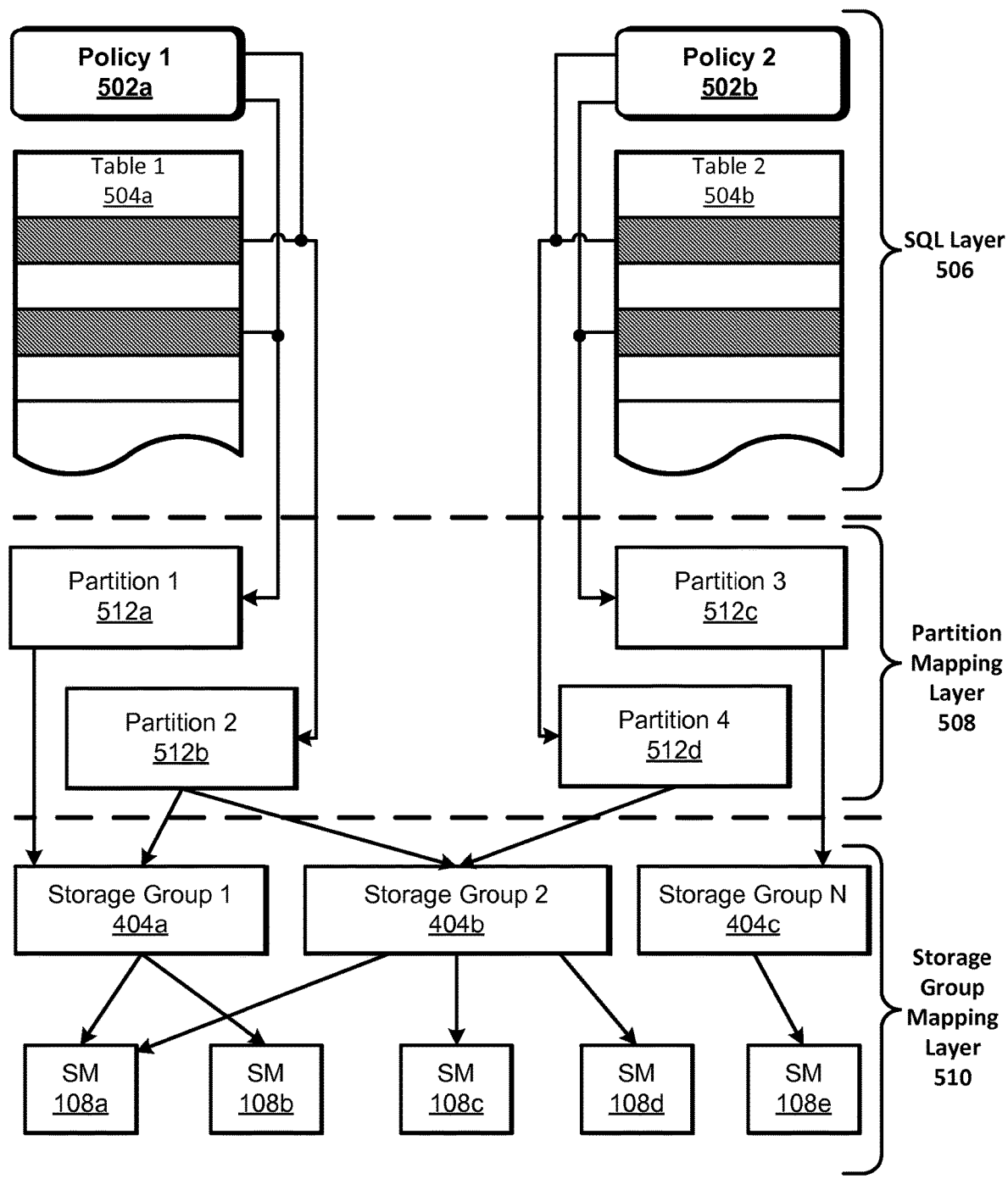
FIG. 5 is a block diagram illustrating an example set of partitioning policies applied to corresponding database tables within the distributed database system of FIG. 1.

Referring now to FIG. 5, a block diagram is shown illustrating an example set of partitioning policies applied to corresponding database tables within the distributed database system of FIG. 1. As shown, FIG. 5 depicts mappings between database objects within a SQL layer 506, partition mapping layer 508, and storage group mapping layer 510. Each of these layers will now be discussed in turn.

In an embodiment, the table partitioning policies 502a and 502b and tables 504a and 504b are representative of underlying database objects within the database and appear in the SQL layer 506. These database objects are also representative of their underlying atoms that enable the table partitioning policies and tables to persist and be distributed within the distributed database 100. As shown, a first table partitioning policy 502a is applied to a first table 504a and a second table partitioning policy 502b is applied to a second table 504b. In an embodiment, application of these policies means that records will be kept (inserted, updated, and removed, as the case may be) in table partitions based on criteria defined within the data definition language (DDL) of the policies. One such specific example of a SQL statement that defines a table partitioning policy, and criteria for the same, is further discussed below with regard to FIG. 6b. Once created, the table partitioning policies 502a and 502b can persist within the distributed database system 100.

Alternatively, or in addition to system-wide DDL-based partitioning policies as described above, the distributed database system can implement operational partitioning that is specific or otherwise local to one or more TE nodes. Operational partitioning, as generally referred to herein, includes one or more partitioning policies implemented by a TE node that are transparent to the SQL layer 506, and can be determined by process-wide properties of a TE. These properties can define a target table partition each new record gets stored into, and what storage group(s) service those target table partitions.

One specific example of an operational partitioning policy includes transparent regional partitioning. In this example, all TE nodes in the same physical region can create and insert new records into a particular table partition assigned to that region. The table partition can be associated with a storage group, with that storage group serviced by SM nodes that are also physically located in the same physical region as the TEs. Thus, operational partitioning can enable data to persist in a particular subset of SM nodes specific to one geographic region. As will be appreciated in light of this disclosure, such a regional partitioning scheme allows the distributed database system 100 to persist data in a particular region to comply with, for example, jurisdictional laws for that region. In addition, regional partitioning allows database clients originating within the same physical region to benefit from optimized (e.g., low-latency) query execution as TE nodes can retrieve data from local SMs, or other local TE nodes, as needed.

As shown, each of the table partitioning policies 502a and 502b is applied to tables 504a and 504b, respectively, such that certain records are mapped to table partitions 512a, 512b, 512c, and 512d within the partition mapping layer 508. As will be discussed further below, each of the table partitioning policies 502a and 502b can include criteria used to perform such mapping in order to ensure that records are stored in an appropriate table partition. As shown, each of the table partitions 512a-512d is mapped to a corresponding storage group 404a, 404b or 404c within the storage group mapping layer 510. Also as shown, each of the storage groups 404a-404c is serviced by one of SMs 108a, 108b, 108c, 108d, and 108e.

As the example embodiment in FIG. 5 illustrates, each table partition is stored in at least one of the plurality of storage groups. Note that a given storage group can include more than one table partition for a given table. Such an association is illustrated by storage group 404a including both partition 512a and 512b for table 504a. An SM node can belong to or can otherwise be associated with any number of storage groups and can thus store partitions mapped to one or more storage groups. This relationship allows for geo-diverse redundancy. For example, each storage group may have a number of SM nodes that are in physical geographic proximity with one another. To provide an extra level of redundancy, an additional SM node can be added to the storage group, with that additional SM node being in a geographically diverse location. In this circumstance, the additional SM can be used as a fail-safe, or additional point of redundancy, in case of a disaster or other catastrophic event (e.g., lightning strike, flood, hacking and other events impacting one or more nodes) local to the other SM nodes that destroys or otherwise makes the other SM nodes unable to store and/or retrieve database objects. In this instance, the additional SM node can continue to store records, service queries, and ultimately prevent an interruption to ongoing database operations.

A system administrator can update SM assignments within storage groups to add, remove, or update which SM nodes service a given storage group, without necessarily updating an existing partitioning policy. In an embodiment, once an SM node has been added to a given storage group, the SM node can perform a synchronization process to gather those atoms from peer nodes of the same storage group that represent the table partitions serviced by that group, and commit them to durable storage. One such example synchronization process 900 is discussed below with reference to FIG. 9a.

Methodology

Figure 9A:
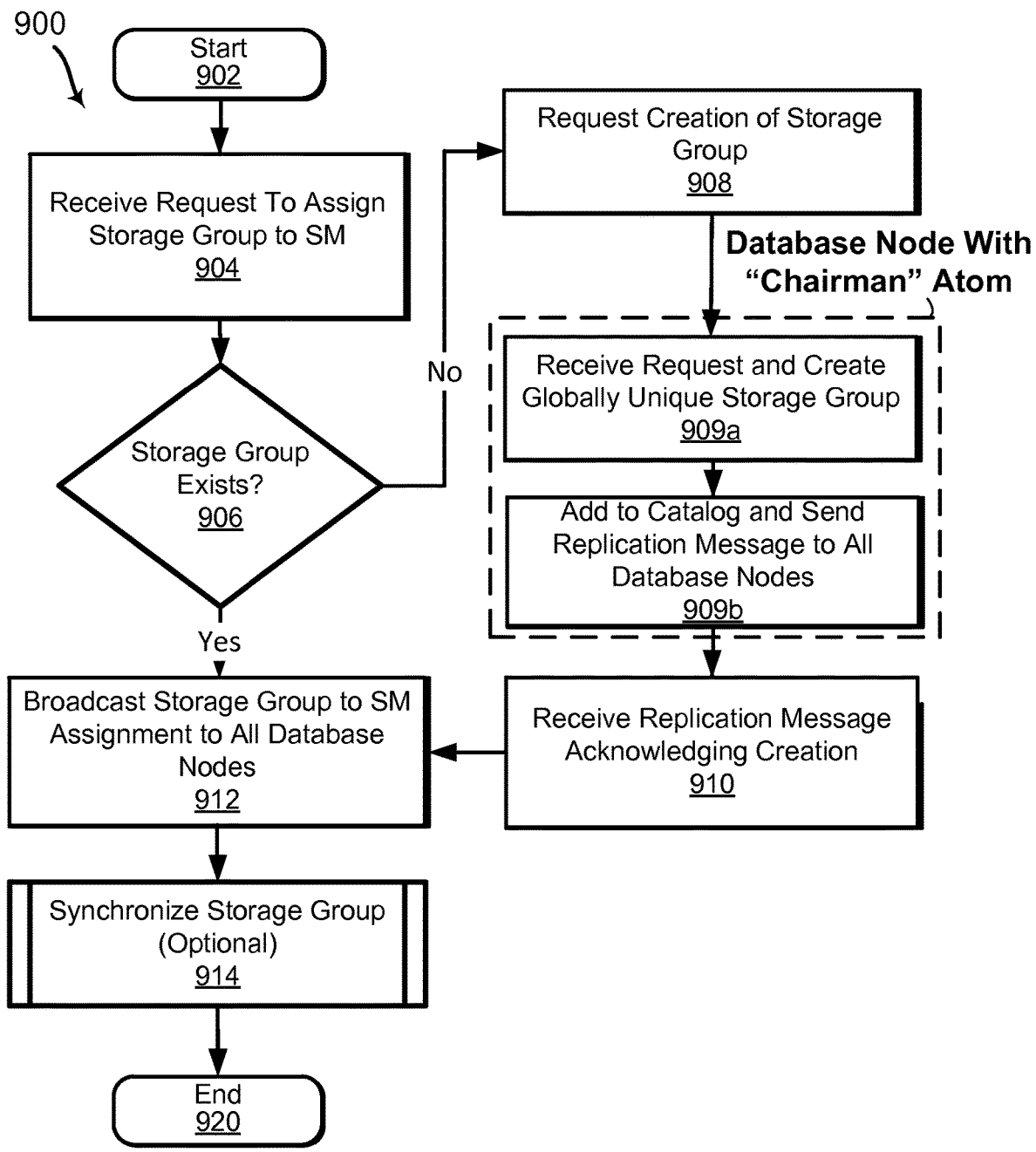
FIG. 9a is a flowchart illustrating an example method for assigning a storage group to a storage manager.

Referring now to FIG. 9a, a flowchart is shown illustrating an example method 900 for assigning a storage group to an SM. This methodology may be implemented, for example, by the distributed database system 100 of FIG. 1, and more particularly by SM nodes such as SM nodes 108a-b. The methodology 900 begins in act 902.

In act 904, an SM receives a request to assign a storage group to an SM node. In one embodiment, the request to assign a storage group to an SM node is generated by an administrative user interface (UI) hosted by an admin node 104. For example, A UI feature may be selected by a user that causes a storage group assignment request message to be sent to the SM node. The storage group assignment request message comprises at least a symbolic storage group identifier (e.g., an alias or other name/ID that unique identifies a storage group). Additional UI features can be directed to assigning table partitions to a storage group, but this example method 900 assumes such assignment previously occurred. For example, an administrator can create new storage groups by executing a UI feature. In addition, an administrator can assign table partitions to that newly created storage group based on a SQL DDL CREATE TABLE or ALTER TABLE statement.

In act 906, the SM determines if the storage group identified within the storage group assignment request message received in act 904 exists. If the storage group does not exist within the distributed database system 100, the method 900 continues to act 908. Conversely, if the storage group does exist within the distributed database system 100, the method 900 continues to act 912.

In more detail, the determination of whether a storage group exists can be based on, for example, the SM examining a storage group table for the distributed database system 100 that includes a record for each existing storage group. In some cases, the storage group table may be located in an internal system area of the distributed database system 100. In other cases, the storage group table may comprise a data structure and is does not necessarily persist as a SQL database table. For example, the distributed database system 100 can store the list of storage groups within a master catalog atom, or other system atom associated with the database and persisted in SM nodes. In any such cases, and as discussed below, such a storage group table can be used in conjunction with a mapping table that maps each table partition to a corresponding storage group. This mapping table can also be persisted within durable storage of SMs as one or more atoms. Thus changes to storage groups, and storage group mappings can occur on-the-fly during operation of the distributed database system.

In act 908, the SM requests creation of the storage group identified in the storage group assignment request message received in act 904. In an embodiment, this includes the SM sending a request to a particular node that is the so-called "chairman" of the master catalog atom. As previously discussed, an atom can be located on multiple nodes within the distributed database system. Thus, one database node operates as the chairman for a given atom, with that chairman coordinating changes system-wide to all other instances of that atom. Further recall that when database nodes first startup they retrieve a catalog atom, with that catalog atom operating a distributed and bootstrapping lookup service. This lookup service enables identification of the chairman node. The SM node can send the request to create the storage group to the database node hosting the chairman atom.

In act 909a, the database node having the chairman atom identified in act 908 receives the request from the SM node to create a storage group. In response, the chairman node generates a globally unique identified (GUID) for the storage group. In act 909b, the chairman node then adds the storage group identifier to the master catalog atom and broadcasts a message to all database nodes to cause them to update their respective copies of the same atom.

In act 910, the SM receives the replication message sent by the chairman database node, with that replication message essentially acknowledging creation of the new storage group requested in act 908. In act 912, the SM broadcasts a storage group to SM assignment message to all peer database nodes to indicate that the SM has now belongs to the newly created storage group. In an embodiment, the distributed database system implements a conflict-free replicated data type (CRDT) that enables replication of storage group operations to all database nodes. Also in act 912, the SM commits the SM assignment to durable storage to ensure that data is available in the event of a power loss or reset.

In act 914, the SM performs a synchronization routine with the storage group such that table partitions associated with that storage group, and more specifically the atoms associated with those table partitions and associated records, are retrieved and stored in the durable storage of the SM. In an embodiment, the SM broadcasts a message to all peer nodes that synchronization is occurring. In addition, the SM can send a storage group message to all peer nodes to indicate that the storage group has entered a synchronizing state on the SM. In some cases, this state change may be received by admin nodes 104, and a UI feature associated with the storage group may visually depict that the storage group is in a "synchronizing" state. While in the synchronization state, the SM acquires atoms related to the table partitions that are serviced by the assigned storage group. One such example synchronization method 901 is discussed further below with regard to FIG. 9b. Once synchronization completes, the SM sends a broadcast message to all peer nodes that synchronization has completed. In addition, the storage group can send a storage group message to all peer nodes that indicates the storage group has entered a "running" state on the SM. The method 900 ends in act 920.

Figure 9B:
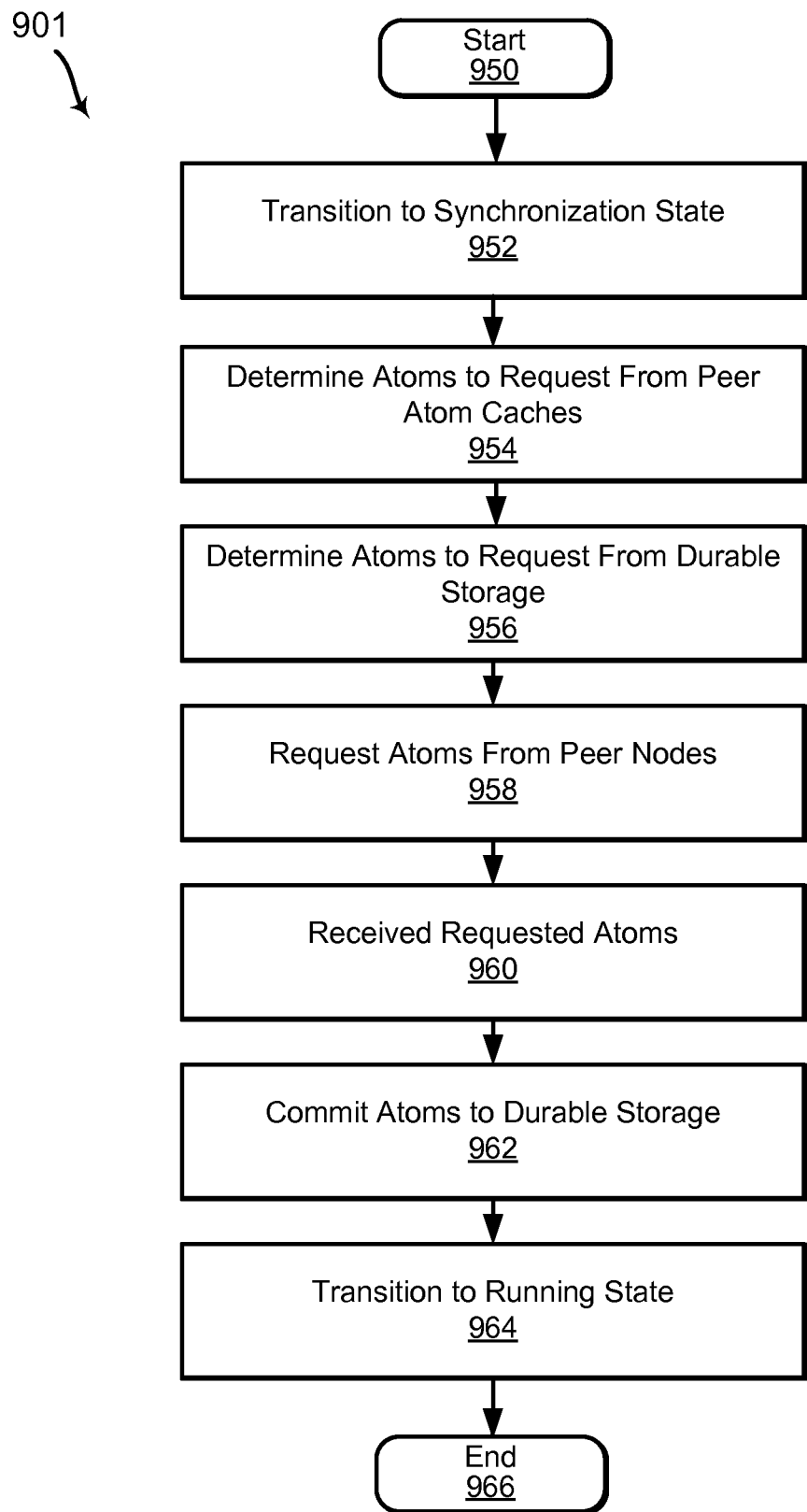
FIG. 9b is a flowchart illustrating an example method for synchronizing a storage group after assignment to a storage manager.

Referring now to FIG. 9b, a flowchart is shown illustrating an example method 901 for synchronizing an SM after a storage group assignment. This methodology may be implemented, for example, by the distributed database system 100 of FIG. 1, and more particularly by SM nodes 108a-b. The method begins in act 950.

In act 952, the SM transitions to the synchronization state, as discussed above with regard to act 914 of FIG. 9. In one embodiment, the SM continues to accept read and write operations on a table partition as synchronization occurs. For example, the SM may service read requests for atoms as they are transferred to durable storage. In addition, the SM can continue to receive write operations and execute them in-memory in order to ensure a consistent database state across all database nodes servicing the same storage group. Note that while examples discussed below include synchronizing a single table partition, any number of table partitions serviced by an assigned storage group can be synchronized using method 901. In addition, an SM can synchronize any number of storage groups using method 901. For example, SM 108a of FIG. 5 can use method 901 to synchronize atoms corresponding to storage group 404a and 404b, respectively. The SM can perform such synchronization of multiple storage groups in a serial fashion, or in parallel. Note transitioning to the synchronization state does not preclude an SM node from receiving replication messages, as database clients can continue to execute write operations against tables stored within a particular storage group. This is to ensure a consistent state of the database, and more precisely, that each SM node servicing a storage group has an identical copy of the database. Thus the SM can concurrently process write operations against table partitions stored within a given storage group, while fetching the atoms stored within a storage group, as described below.

In act 954, the SM determines what atoms are associated with the table partition serviced by the assigned storage group, and among those atoms, which are available in peer node atom caches 210. In an embodiment, the SM determines a list of such atoms and the corresponding nodes where such atoms are cached.

In act 956, the SM determines what remaining atoms should be requested from peer node durable storage. In an embodiment, this includes the SM communicating with other database nodes in the same storage group to determine which atoms can be requested from durable storage to synchronize the table partition. For example, the SM may send a request for aggregated last write times of each atom within durable storage associated with the table partition. In this example, the SM may compare each last write time to a corresponding last write time of atoms that exist in its own durable storage to determine which atoms to request from other nodes. In another example, the SM node can use fingerprints (hashes) to compare the atoms on disk and in memory between the syncing node and the rest of the database. So, in the event synchronization was previously interrupted because of, for example, power failure or loss of network connectivity, the SM can skip synchronization of those atoms that were previously retrieved. In another example, if the SM has not yet synchronized the assigned storage group, the SM will request all atoms from other SM nodes in the same storage group. In any such cases, the atoms to be retrieved from other SM nodes in the same storage group are then added to the same list determined in act 954, or to a separate list, depending on the configuration.

In act 958, the SM utilizes the one or more lists of atoms determined in acts 954 and 956 to request atoms from corresponding nodes having those atoms. In an embodiment, the SM sends one atom request per atom to a particular node. In another embodiment, the SM sends a request to a given node with a list of atoms to be retrieved from that node.

In act 960, the SM receives the atoms requested in act 958. In act 962, the SM commits the received atoms to durable storage. In act 964, the SM transitions from a synchronizing state to a running state, and broadcasts a message indicating that transition to peer nodes of the distributed database system 100. In an embodiment, the admin nodes 104 may have a UI feature that depicts this transition of the SM from the synchronizing state to the running state. The method 901 ends in act 966.

Figure 9C:
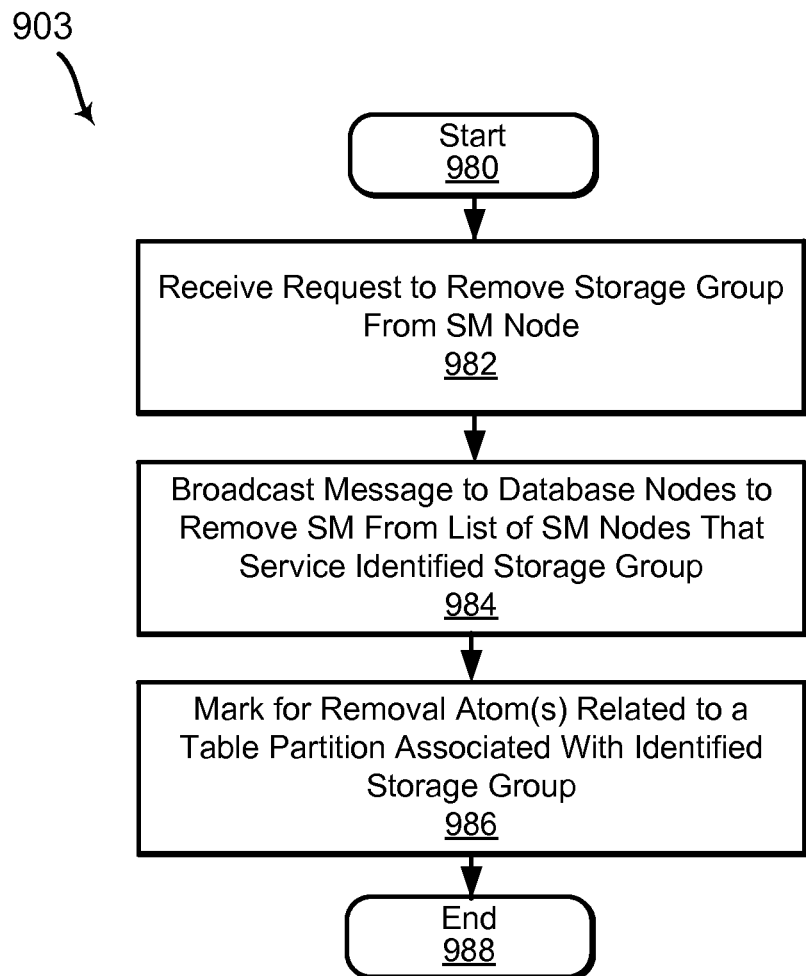
FIG. 9c is a flowchart illustrating an example method for removing a storage group from service on a storage manager.

Referring now to FIG. 9c, a flowchart is shown illustrating an example method 903 for removing a storage group from service on an SM node. This methodology may be implemented, for example, by the distributed database system 100 of FIG. 1, and more particularly by SM nodes such as SM nodes 108a-b. The methodology 903 begins in act 980.

In act 982, the SM receives a request to remove a storage group from service, such that the SM will no longer store table partitions associated with the identified storage group. In an embodiment, this request may be sent by, for example, an admin node 104 in response to a user command. In some cases, the distributed database system 100 may prevent an SM from being removed from a storage group if it is the only SM servicing that group, and the storage group contains valid data (e.g., a table partition is mapped to the storage group).

In act 984, the SM broadcasts a message to all database nodes to remove the SM from the list of SM nodes that service the identified storage group. In response, the TE updates a mapping that identifies SM nodes servicing a given storage group. In act 986, the SM identifies one or more atoms related to a table partition associated with the identified storage group and marks those atoms for removal. In an embodiment, a periodic garbage collection routine removes the marked atoms from the durable storage of the SM. The method 903 ends in act 988.

Figure 6A:
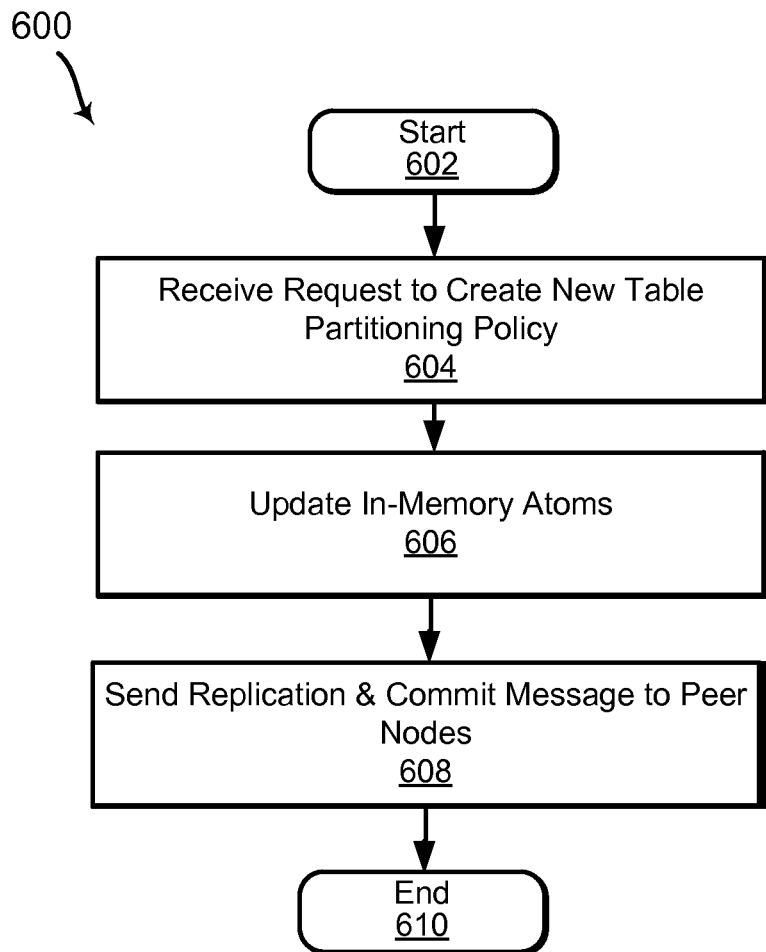
FIG. 6a is a flowchart illustrating an example method for creating and applying partitioning policies across multiple database nodes within the distributed database system of FIG. 1.

Referring now to FIG. 6a, a flowchart is shown illustrating an example method 600 for creating and applying partitioning policies across multiple database nodes within the distributed database system of FIG. 1. This methodology may be implemented, for example, by the distributed database system 100 of FIG. 1, and more particularly by TE nodes 106a-c. The method 600 begins in act 602.

In act 604, a TE node receives a request to create a new table partitioning policy. In some cases, the request to create the new table partitioning policy is received via, for example, a database client executing a query. In these cases, table partitioning policies can be created by DDL within SQL statements.

FIG. 6b illustrates an example query 601 that defines a partitioning policy 603. The example table partitioning policy 603 can be understood as a set of rules that govern how a table identified by table identifier 650 should be divided up into individual partitions. The table partitioning policy 603 defines at least one partition key 656 and partitioning criteria 654. The partitioning criteria 654 enable a record to be analyzed and ultimately stored in a correct partition. For example, the table "inventory" is partitioned by a PARTITION declaration 651 that includes a BY LIST partitioning scheme identifier 652 and a partition key 656 set as "territory." As can be seen, "territory" is a column within the inventory table that includes a column type of character (e.g., CHARACTER(2)) configured to store two characters. To this end, the partitioning criteria 654 define a plurality of rules whereby certain instances of two-letter territories appearing within that partition key 656 "territory" are assigned to specific partitions. For example, and as shown, where the partition key 656 includes key values identifying states Florida (FL) and Georgia (GA), records will assigned to partition "pse" 662. In turn, partition "pse" 662 will be stored in storage group "SSE" 660, based on the STORE IN keyword 658 followed by the symbolic name of a storage group (e.g., "SSE" 660). The symbolic name of a storage group does not need to be explicitly referenced by the STORE IN keyword 658. For example, a predefined default storage group may be assigned if no storage group is identified. In addition, the partition key 656 may be followed immediately by a STORE IN keyword similar to the STORE IN in keyword 658, and thus cause each of the partitions to be assigned to a particular default storage group by default. In an embodiment, the symbolic name of the storage group (such as "SSE" 660) comprises at least one of a numeric identifier, a system-provided alias, a user-provided alias, and a globally unique identifier (GUID)

FIG. 6b illustrates one example of a DDL operation that can be used to define a partitioning policy that is based on a particular partitioning scheme and particular partitioning criteria. Other DDL operations can be used in other embodiments to establish different partitioning policies that map records to partitions and associate those partitions with identified storage groups. In general, the details of a particular partitioning policy can be defined based on the demands of a given application.

Referring now to FIG. 6c, an example query 605 that defines a partitioning policy that includes sub-partitioning is illustrated. In an embodiment, the distributed database system 100 can cause table partitions to be further divided by sub-partitioning policies. These sub-partitioning policies enable additional criteria to be specified such that records are organized in a manner that can increase query efficiency and allow fine-grained data management operations. As shown, sub-partitioning within a partition policy includes a SUBPARTITION declaration 672 and a partitioning scheme identifier 674. The partitioning scheme identifier 674 can include criteria similar to those discussed above regard to FIG. 6b. However, as can be seen, the sub-partitioning scheme enables fine-grained storage group selection such that records are stored in specific table partitions within storage groups based on ranges, intervals, lists or other types of partitioning schemes and combinations thereof. For example, and as shown, partition key values of "NY" or "CT" can be stored in storage group "sne", with a sub-partition created to divide records based on a value appearing in the price column. Thus sub-partition declarations use a sub-partition key 676. Note, that the partitioning criteria and partitioning schemes discussed above with regard to FIG. 6b also apply to the sub-partitioning criteria shown in FIG. 6c.

The criteria that form part of a partitioning policy, such as the queries illustrated in FIGS. 6b and 6c, can use a variety of different partitioning schemes, including range partitioning, list partitioning, hash partitioning, and combinations of the foregoing. A table partitioning policy can also define procedures for handling records having a partition key value that does not meet any defined criteria. For example, if an outlying record has a key value that exceeds the ranges that form part of a range-based partitioning policy, the distributed database system 100 can be configured to create a new table partition (and assign that new partition to a storage group) to accommodate the outlying record. An outlying record can alternatively be assigned to a table partition that represents the lowest or highest of the ranges that define the range-based partitioning policy. Regardless of what type of partitioning scheme is implemented, the distributed database system 100 can also delete existing table partitions after a predefined time period based on an aging policy. In some cases, the aging policy can define long periods of time (e.g., years) such that hundreds or thousands of active table partitions exist within a given database. In other cases, the distributed database system 100 maintains a maximum number of active table partitions utilizing, for example, a first in, first out (FIFO) aging policy that truncates existing partitions.

In another example, the distributed database system 100 can split an existing table partition (or unpartitioned table) as desired or when records in a particular table or table partition grow beyond a particular size. For example, if a particular range of partition key values corresponds to a large number of corresponding records, the partition corresponding to that range can be split into two or more table partitions. Thus, a table partition or table can be split into smaller partition tables without necessarily having to recreate a new partition. This flexibility is achieved, in part, because database objects are represented by atoms which are associated with a given partition. A partition splitting operation can be invoked by modifying partition associations for the atoms comprising the split partition. Because table partitions can be stored on a number of SM nodes servicing a corresponding storage group, each SM performs a substantially similar process to split a partition.

Interval partitioning is an extension of range partitioning wherein a new table partition is created automatically upon encountering a new record having a key value that exceeds a previously defined set of ranges. Interval partitioning is often implemented in the context of a date- or time-based partition key, although it is also suitable for a wide range of other partition keys, such as postal codes, income brackets, and other quantifiable measures. For example, consider a distributed database system 100 storing records partitioned by year, such that a separate partition contains records having partition key values 1985, 1986, and 1987. Upon encountering a record having a partition key value 1988, a new partition for year 1988 will be created. Thus an interval partitioning policy may define a default interval that should be used to define a new partition.

In an embodiment, table partitions can be created automatically based on a modifiable interval, such that as a defined range is exceeded an additional partition table is created to account for the next range of values. In these cases, an initial interval can be defined (e.g., a range of numeric values, date values, or time values). When the range is exceeded, a new partition table can be automatically created. Within the new partition table, records are stored for the same interval. By way of example, if the initial interval was defined as identifier 0 to 100, then a record with a partition key of 101 would cause a new partition table to be created. The new partition table would then be configured to service identifiers 101 to 200, respectively. This automatic generation of table partitions can continue indefinitely, and is optionally subject to table partitioning aging policies as discussed above. In any such case, the automatically generated table partitions can be named using an automatic naming mechanism and mapped to a storage group. In some cases, a STORE IN keyword can be utilized that identifies one of multiple available storage groups, and in these cases, the distributed database system 100 can cause the automatically generated table partitions to be mapped in a round-robin fashion onto the available storage groups.

The distributed database system 100 optionally creates table partitions at substantially the same point in time the partitioning policy is applied, and maps those table partitions to specified storage groups or a default storage group, as the case may be. In some cases, insertion of a record by a client that is not defined within a list or range specified by the partitioning policy can cause a SQL exception to be propagated to the client. In the context of unpartitioned tables, the distributed database system 100 can be configured to assign a table to a storage group without dividing that table into partitions.

The table partition manipulation operations discussed above such as splitting partitions and deleting partitions should not be considered an exhaustive list. For example, partition manipulations operations can also include adding new partitions, deleting partitions, renaming partitions, truncating partitions, swapping partitions between nodes, merging partitions, and reassigning partitions to a different storage group, just to name a few. Further note that while the example embodiments disclosed herein generally refer to table partitioning, other database objects may also be partitioned, such as table indexes. In such cases, the partitioning scheme for a given table is also applied to its associated indexes to enable local indexes to be available for query purposes.

Returning to the method 600 of FIG. 6a, and more particularly act 606, an SM updates locally cached atoms to create the new partitioning policy, and to associate a table with the partitioning policy. Recall that database objects can be represented by atoms within the distributed database system 100. So locally cached atoms are updated in the sense that atoms are created and/or updated as needed to represent the new partitioning policy. Those created/updated atoms can then be associated with a respective table through, for example, storing a link in an atom that represents the respective table that "points" to the updated/created atoms. In some cases, the SM node already has all of the atoms that should be updated its atom cache 210. In other cases, one or more atoms are retrieved from durable storage to perform the updates. In act 608, the TE sends replication messages to all peer nodes in the distributed database system 100 that causes each peer nodes to create or update atoms representing the newly created partitioning policy. For SM nodes, these replication messages are followed by a commit message to cause the atoms associated with the partitioning policy to be stored in durable storage. For TE nodes, the replication messages can also be followed by a commit which causes the new partitioning policy to be applied to subsequent transactions. In any such cases, peer nodes (e.g., TE nodes, and SM nodes) within the distributed database system 100 are thus synchronized such that they apply the new table partitioning policies and execute subsequent transactions in a uniform manner. The method 600 ends in act 610.

Figure 7A:
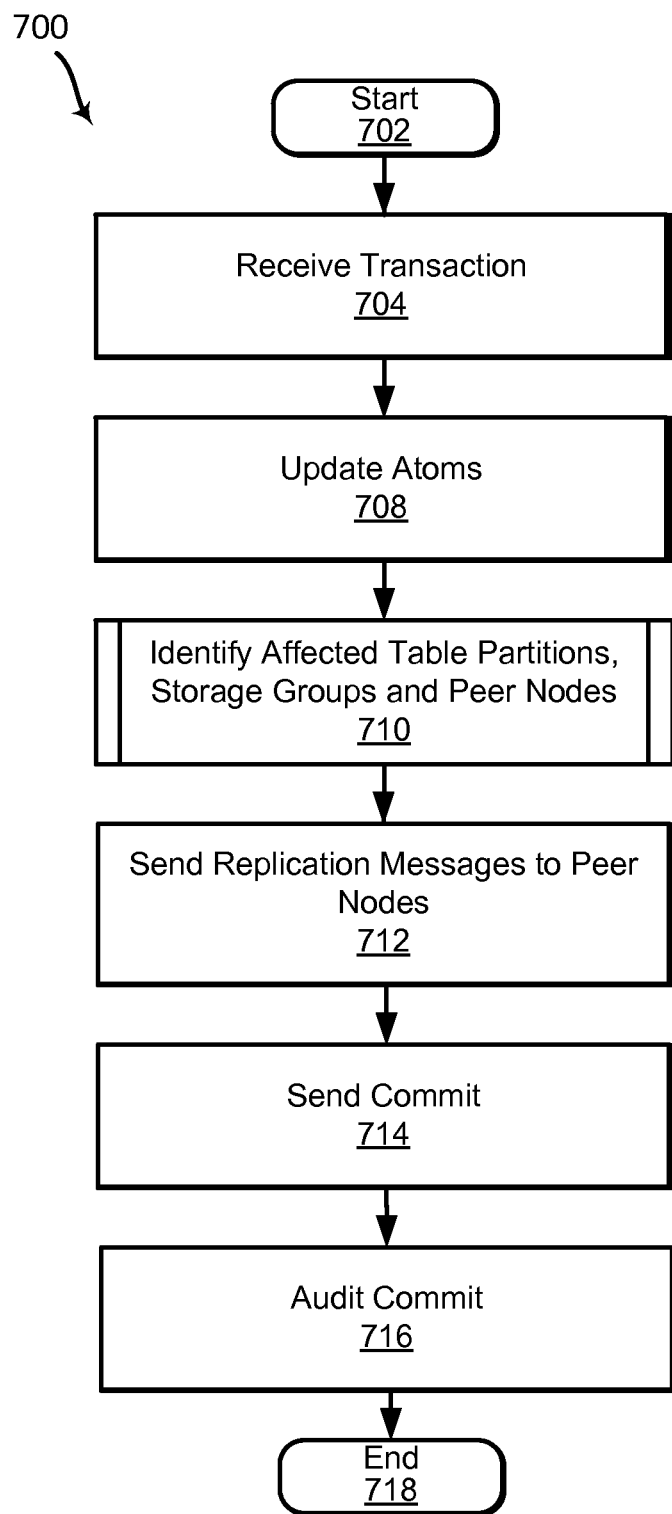
FIGS. 7a and 7b comprise a flowchart illustrating an example method for processing a distributed transaction that affects multiple partitioned tables within the distributed database system of FIG. 1.

Now referring to FIG. 7a, a flowchart illustrating an example method 700 for processing a distributed transaction that affects multiple partitioned tables is shown. This method may be implemented, for example, by the distributed database system 100 of FIG. 1, and more particularly by TE nodes 106a-c. The method 700 begins in act 702.

In act 704, a TE receives a database transaction from, for example, an SQL client 102 utilizing the SQL client protocol 202. The database transaction includes data manipulation language (DML) that can target a particular table or set of tables. One or more of those tables may be subject to a table partitioning policy, with corresponding table partitions stored on a subset of SM nodes that comprise a storage group, as discussed above with regard to FIG. 6a-6c. Such a transaction that affects two or more table partitions serviced by different storage groups can be described as a distributed transaction. So, initially the TE utilizes the SQL parser 204 to determine what tables are affected by the received transaction. In an embodiment, the TE utilizes a catalog to locate each corresponding table atom. Recall that atoms are linked, so table atoms can also link to schema atoms, index atoms, record atoms and data atoms, just to name a few. In some cases, table partitioning policies can be linked in a similar fashion. In other cases, table partitioning policies can reside in a database table that can be queried to identify if a database table is associated with a table partitioning policy.

In act 708, the TE updates those atoms affected by the transaction received in act 704. As discussed above, the TE node can retrieve atoms from the atom cache 210 of peer nodes (e.g., TE nodes, SM nodes). Where a miss occurs, atoms are retrieved from durable storage of an SM node to satisfy a transaction. In any event, updates to atoms occur causing, for example, new atoms to be created or existing atoms to be updated. For instance, the TE performs data manipulations (e.g., inserts, updates, deletes) specified in the received transaction. As discussed above, these data manipulations can comprise DML, or an equivalent thereof, that causes atoms to be updated in a manner that alters the database objects represented by those atoms. As discussed above with regard to FIG. 3, this can include appending or otherwise adding additional version states to each affected atom. Within the context of ACID properties and MVCC functionality, this enables each transaction to manipulate database data without causing concurrent transactions to see an intermediate or otherwise invalid database state.

In act 710, the TE identifies table partitions affected by the transaction using table partitioning policies. Table partitioning policies can include partitioning criteria that ensures records having particular column values end up in an appropriate table partition. Thus, the TE can identify those affected table partitions by comparing the DDL within the transaction to the criteria within the partitioning policies. Identifying the affected table partitions also enables the TE to determine a storage group for that table partition based on a symbolic storage group identifier that corresponds to each partitioning criteria within table partitioning policies. For example, consider the example DDL 601 of FIG. 6b. If a transaction seeks to insert a record with "WA" in the territory column, the TE can identify a table partition "pnw" and a storage group "SNW."

In some cases, tables may be unpartitioned such they comprise one table. In these cases, the tables may belong to a default storage group that is serviced by all SM nodes. In any such cases, the TE can identify a list of database nodes to send replication messages to in order to cause those nodes to update their respective copies of the database in accordance with the transaction received in act 704. In addition, the node can identify other "interested" database nodes based on those nodes having one or more atoms in their respective atom caches that are associated with a particular storage group affected by a transaction. In this case, at least one table partition is identified as being affected by the received transaction. One example method further describing how the TE makes such identifications is discussed further below with regard to FIG. 7b.

In act 712, replication messages are sent to peer nodes within the distributed database system 100. This includes sending replication messages to each TE node, and SM node that hosts atoms affected by the received transaction. For example, TE nodes 106a-106c may have atoms within their respective atom caches 210 that are affected by the transaction. Likewise, SM nodes 108a and 108b may also have affected atoms in their atom caches 210, and/or their durable storage locations 112a and 112b. However, and as discussed below, because of the applicable partitioning policy, only certain peer nodes will host affected atoms, and thus in certain implementations only those nodes identified in act 710 receive replication messages configured to perform operations in accordance with the received transaction.

A given transaction can affect both unpartitioned tables and partitioned tables, with partitioned tables being distributed amongst numerous database nodes. So, the replication messages sent to peer nodes can include directed messages sent to just those SM nodes servicing a given table partition (in addition to TE nodes that may have atoms associated with that table partition). As discussed above, the distributed database system 100 can assign unpartitioned tables to a default storage group serviced by all SM nodes. In this case, a transaction affecting a record in a unpartitioned table causes the TE node to send a replication message to all SM nodes of distributed database system 100. In act 714, a commit is sent to the nodes which received a replication message to finalize atom changes, and in the context of SM nodes, to cause those atom updates to be made durable.

In act 716, atom updates may be committed to a global audit trail. In an embodiment, a global audit trail is stored within the durable storage of SM nodes within the distributed database system 100 and is thus accessible by peer nodes. In some cases, the global audit trail is a database table that includes records that log, for example, a transaction identifier, tables affected by the transaction, a table partitioning policy, a partition key value, and a storage group. In an embodiment, the global audit trail provides an audit log that enables administrators to determine compliance with the partitioning policies. In some cases, the analysis is done by manual interaction by an administrator utilizing database queries (e.g., JOINS, SELECTS, and so on). In other cases, an automated process monitors in real-time or otherwise prospectively analyzes the global audit trail to determine compliance. In some such cases, an alert comprising an email, a text message, or other notification may be sent to an administrator if a record is sent to an incorrect storage group. In addition, periodic reports may be generated that detail statistics such as the number of records sent to each storage group over a period of time, compliance analysis, and overall storage group health diagnostics (e.g. SM node uptimes, downtimes and faults). In act 718, the methodology 700 ends.

Figure 7B:
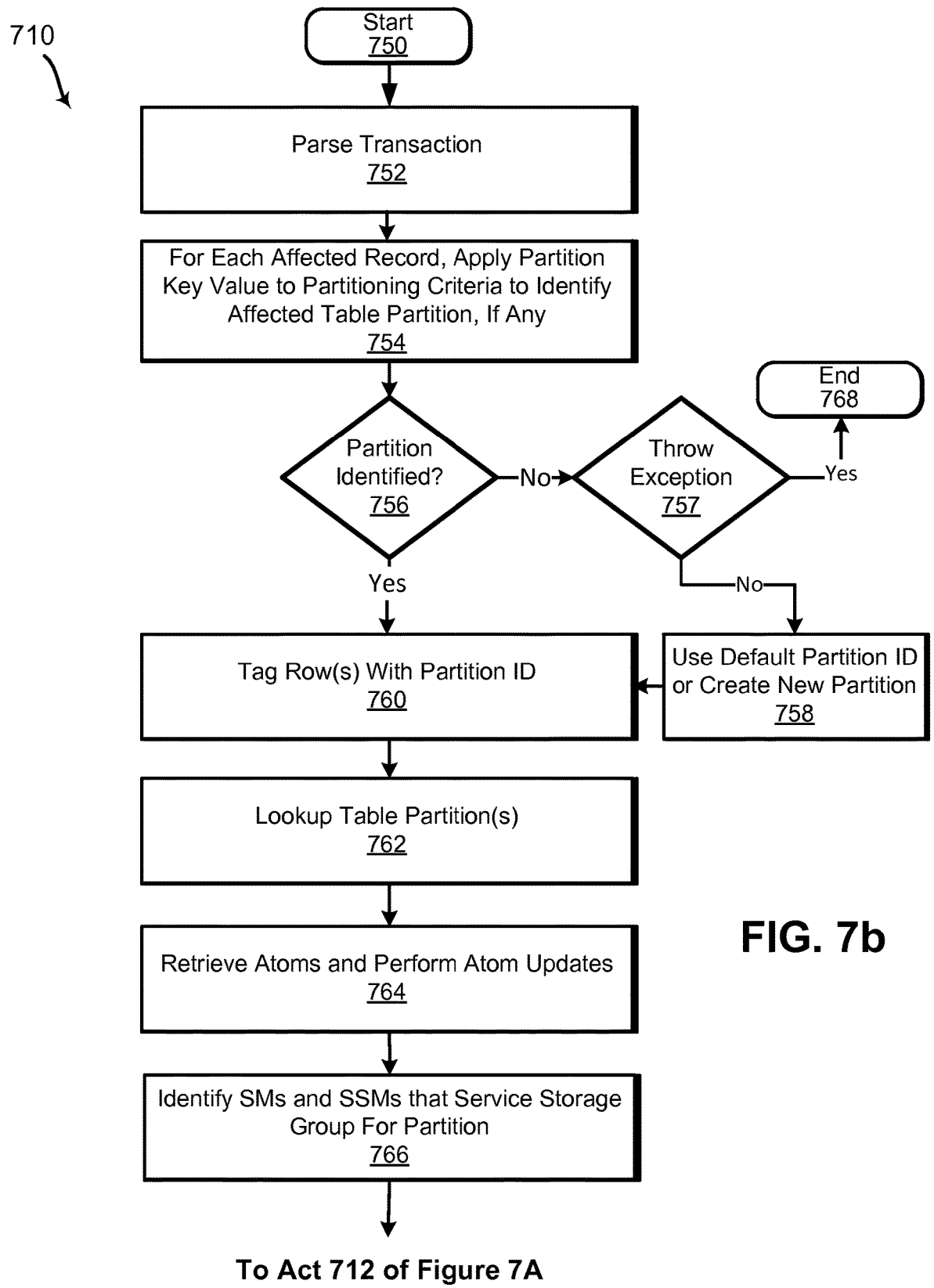

Referring now to FIG. 7b with additional reference to FIG. 7a, an example method 710 for identifying table partitions affected by the database transaction is shown. This methodology may be implemented, for example, by the distributed database system 100 of FIG. 1, and more particularly by TE nodes 106a-c. The method 710 begins in act 750.

In act 752, the TE parses the transaction received in act 704 of FIG. 7a utilizing the SQL parser 204 of FIG. 2b to extract partition key values from affected records. In act 754, the TE applies the partition key value for an affected record to the criteria set forth in the applicable table partitioning policy, thus allowing an affected table partition to be identified. By examining the partition key value for each record affected by the received transaction, the TE can identify a table partition that should be updated for each affected record. In some cases a given affected record is not associated with any table partition. This will occur, for example, where the partition key value for an affected record does not satisfy any of the criteria set forth in the applicable table partitioning policy. In act 756, the TE determines whether a table partition is identified for each of the affected records. Affected records that are associated with an identified table partition are processed according to act 760, while affected records that do not satisfy any of the partitioning criteria and thus that are not associated with any table partition are processed according to act 757.

In act 757, the TE determines if an exception should be thrown and propagated to the client that executed the transaction to indicate the transaction cannot be completed. For example, if a partition key is not within a bounded list, an exception may be thrown that details the same. In such cases, the methodology ends in act 768. In other cases, an exception is not thrown because a default table partition identifier can be utilized or a new table partition can be created to service the transaction. In these cases, the method 710 continues to act 758.

In act 758, a default table partition identifier is utilized or a new table partition is created to service the transaction. As discussed above with regard to FIG. 6a, such circumstances can occur when, for example, a partition key exceeds a defined range. In any event, the default table partition identifier, or the identifier of a newly created table partition can be identified, associated with the record that is affected by the received transaction, and used in subsequent acts of the methodology 710. The methodology 710 then continues to act 760.

In act 760, the records affected by the transaction are tagged or otherwise associated with the table partition identified in act 756 or act 758.

In act 762, each table partition identified in act 760 is looked up by, for example, examining a catalog or other index that maps table partition identifiers to atoms. In an embodiment, each atom includes an identifier that allows such a lookup to occur. Recall that atoms can represent all database objects, and thus, also represent table partitions. Also recall that atoms are linked and that by locating a partition atom in a catalog (e.g., by a table number, table alias, or other unique identifier), the table atoms of the corresponding table can also be located. In a sense, the table atom is a parent atom that can link many to child atoms, including table partition atoms. To this end, index atoms, record atoms, data atoms, and other related table partition atoms can be located as well.

In act 764, atoms located in act 762 are retrieved and updates performed, as described above with regard to act 708 of FIG. 7a. In some cases, the located atoms may be already available in the atom cache 210 of the TE. In other cases, the located atoms may be requested from peer nodes including other TE nodes and SM nodes. In act 766, SM nodes that service the storage group for the identified partitions are identified. As discussed above, SM nodes can be filtered out such that only those nodes that service the storage groups for the identified table partitions are utilized by the replication process discussed above with regard to act 712 of FIG. 7a. In one embodiment, such filtering is performed by a mechanism within atoms that automatically tracks which nodes have those atoms within durable storage. In this embodiment, an atom includes a reference to all nodes that have a copy of that atom in durable storage. To this end, the filtering of nodes discussed above with regard to FIG. 7a can be an automatic function. In other embodiments, nodes can be filtered based on a lookup table that maps table partition identifiers to storage groups. In this embodiment, storage group assignments can then be used to determine what SM nodes are associated with a given storage group. In any such cases, the methodology continues to act 712 of FIG. 7a, and performs replication procedures such that the SM nodes responsible for servicing the identified storage groups received updated atoms for their respective table partitions.

Figure 7C:
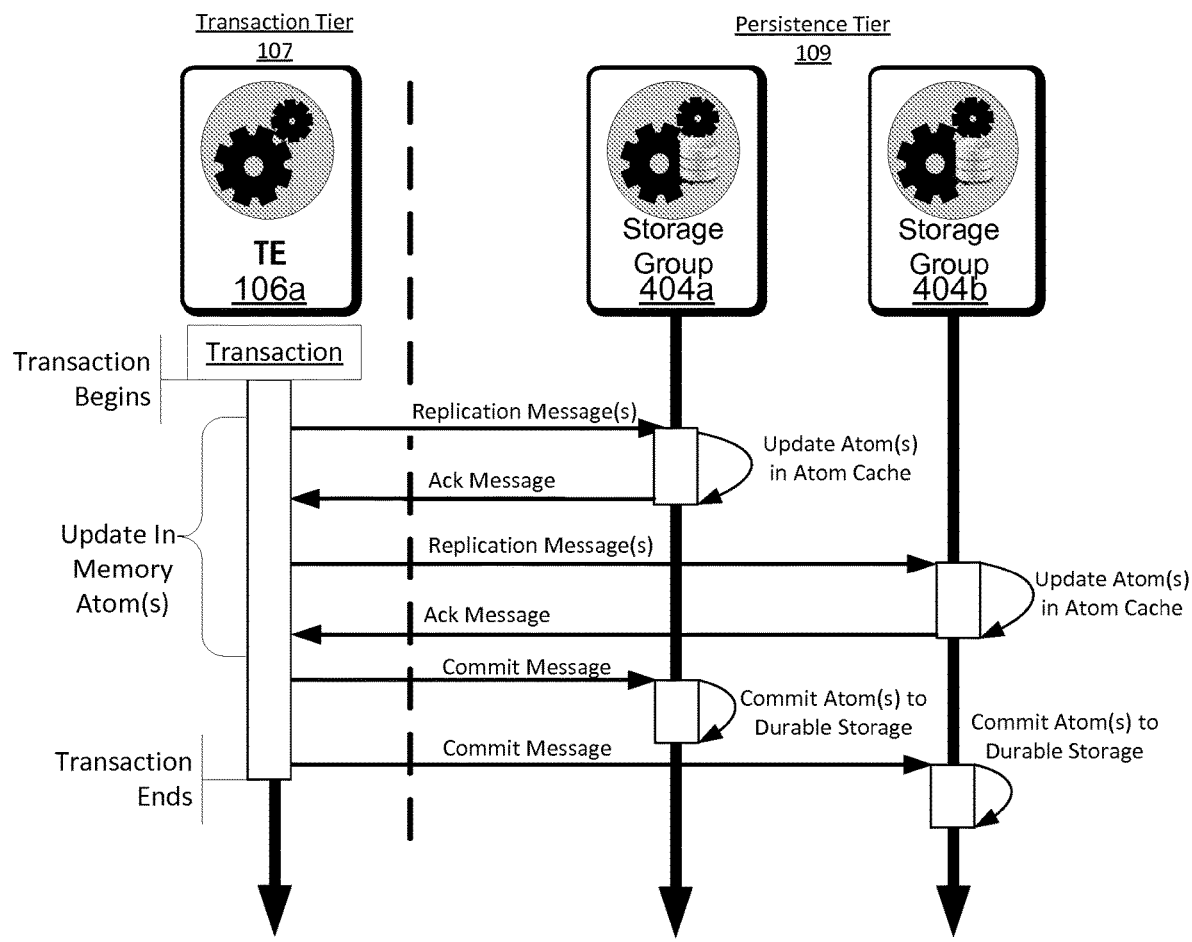
FIG. 7c illustrates an example data flow associated with the methodology illustrated in FIGS. 7a and 7b.

Referring now to FIG. 7c, an example data flow associated with the methodology of FIGS. 7a and 7b is shown. As shown, a transaction begins at first point in time at the TE node 106a. During the course of performing the transaction, the TE node 106a can update those atoms representing database data that is to be manipulated (e.g., inserted, updated and deleted) according to the DML within the given transaction. In some cases, the atoms affected by the transaction correspond to tables that are partitioned and stored in respective storage groups. To this end, those affected atoms may be retrieved from an SM node, or other peer nodes (e.g., other TE nodes). In any such cases, the TE node 106a can perform in-memory updates in volatile memory (e.g., utilizing an atom cache) on those atoms affected by the transaction. In addition, and in accordance with an embodiment, the TE node 106a can send replication messages to all SM nodes within a storage group that services a particular table partition. For example, and as shown, storage group 404a and storage group 404b both receive replication messages during execution of the transaction. Thus, all SM nodes within storage group 404a (e.g., SM nodes 108a and 108b) receive replication messages that correspond to atoms stored only in their respective durable storage locations, and all SM nodes within storage group 404b (e.g., SM nodes 108c and 108d) likewise receive replication messages particular to only those atoms stored in their respective durable storage.

In a more general sense, this means that table partitions that are stored only on the subset of SM nodes within each of the storage groups 404a and 404b receive replication messages and enables them to be synchronously updated in accordance with transactions executed by the TE node 106a. Such a replication procedure can be accurately described as a symmetrical update process as two or more SM nodes within each storage group can be updated in parallel. It should be appreciated that the specific example embodiment shown in FIG. 7c depicts an update to two different table partitions serviced by storage groups 404a and 404b, respectively, and can be accurately described as a distributed transaction. However, it should be appreciated in light of this disclosure that any number of table partitions belonging to any number of storage groups could be updated by the same distributed transaction.

In an embodiment, the distributed database system implements a tunable commit protocol, as illustrated in FIG. 7c. In an embodiment, the TE 106a anticipates receiving a commit acknowledgment from each storage group 404a and 404b prior to broadcasting a commit message. The number of acknowledgements prior to commit is one aspect of the tunable commit protocol. For instance, if there are multiple SM nodes servicing the same storage group, the tunable commit protocol may require an acknowledgment message from N nodes of those SM nodes to satisfy the protocol. One SM node's acknowledgment may be enough, depending on a desired configuration. A second aspect of the tunable commit includes an ability to change such requirements on-the-fly. For example, one option includes a so-called "remote" commit, also known as a two-stage commit, and can include a pre-commit followed by waiting for acknowledgement responses from each SM node servicing a storage group prior to sending a final commit. Another such example option includes a so-called "local" commit which does not send a pre-commit message or wait for acknowledgement responses prior to commit. Yet another option includes a so-called "region" commit which is similar to a remote commit but requires N regions per storage group to acknowledge the commit. Once the TE node 106a receives a satisfactory number of acknowledgment messages, the transaction proceeds to the committed state, as shown.

Figure 8A:
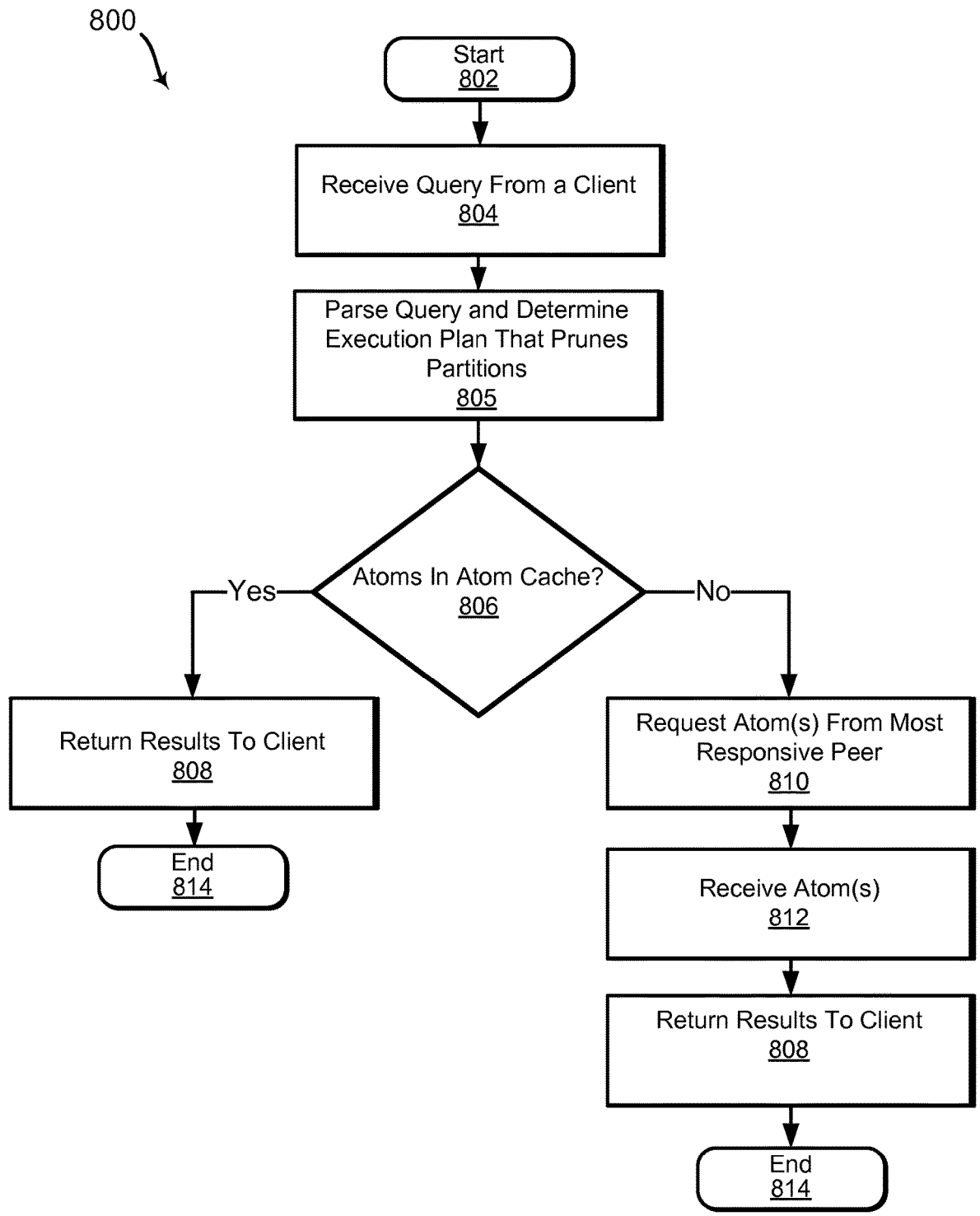
FIG. 8a is a flowchart illustrating an example method for performing database queries using the partitioned tables that form part of the distributed database system of FIG. 1.

Referring now to FIG. 8a, a flowchart illustrating an example method 800 for performing database queries using the partitioned tables that form part of the distributed database system of FIG. 1 is shown. This methodology may be implemented, for example, by the distributed database system 100 of FIG. 1, and more particularly by TE nodes 106a-106c. The method 800 begins in act 802. In act 804, a TE node (e.g., TE nodes 106a-106c) receives a query from a database client, such as the SQL clients 102.

In act 805, the TE node determines a query execution plan that prunes partitions irrelevant to the query. Recall that that during query execution, the optimizer 206 can ignore large portions of a table that may not be relevant to a query. In operation, this means that the TE node can use partition keys within the partitioning policies to determine one or more partition tables affected by a query, and filter out those irrelevant table partitions. For example, if a partition key "territory" exists on a countries table, queries against that table for "region='KY'", can cause the TE to prune out those table partitions unrelated to the "KY" region.

In act 806, the TE determines if the query received in act 804 affects any atoms not presently loaded into its respective atom cache. The atom to SQL mapping module 208 enables the TE to determine which atoms are affected by a given query based on the database objects referenced in the query. Recall that all database objects can be represented by atoms within the distributed database system 100. Also recall that atoms are linked, and to this end, the TE determines atoms affected by the query based on, in part, a query execution path that traverses these links and uses index atoms, table atoms, record atoms, and other such database objects. In a general sense, the TE determines affected objects in a manner that leverages the relational model, or whatever model the database presently implements (e.g., an RDF-base model).

If all affected atoms are within the atom cache, the TE node returns a result set to the client in act 808 exclusively from the atom cache. As will be appreciated in light of this disclosure, this enables queries to be efficiently serviced without incurring latencies related to disk access, or roundtrips related to requesting atoms from peer nodes. If the query received in act 804 affects any atoms not in the atom cache, the methodology 800 continues to act 810.

Note that result sets from queries are not atoms per se; rather, they are in a form that comports with the data structures anticipated by a given client. For instance, a SQL client receives SQL-compatible result sets without regard for the underlying atom-structure of those results. Some such SQL-compatible result sets include columns, rows and values of records located by a query and serialized or otherwise formatted in a manner that comports with a given configuration of the SQL client performing the query. In an embodiment, this translation from atom to a SQL-compatible result set can also be performed by the SQL mapping module 208.

In act 810, those atoms that are not available in the atom cache are requested from a most-responsive or otherwise low-latency peer database node. As discussed above, various mappings can be used to identify if affected atoms correspond to a partitioned table, and to also identify a filtered set of nodes that service the storage group for a given table partition. To this end, the filtered list of nodes may be utilized by the TE node to request atoms, as needed. In one embodiment, the TE node can mitigate latencies by requesting atoms from those database nodes that have the lowest ping or are otherwise known to have the fastest round-trip response (e.g., in milliseconds). It should be appreciated that queries are not necessarily limited to servicing by SM nodes alone. For instance, peer TE nodes are preferred over persistence tier nodes because the atoms can be retrieved from their atom caches, and thus minimize IO costs. So, queries can be serviced by leveraging the distributed database system 100 to locate the relevant atoms and satisfy queries efficiently.

In act 812, the TE receives one or more atoms requested in act 810. In act 808, the TE performs atom-to-SQL mapping to construct a result set that comports to the requirements of the client (e.g., a SQL-compatible result set), and communicates the constructed result set to the client. In act 814, the methodology 800 ends.

Figure 8B:
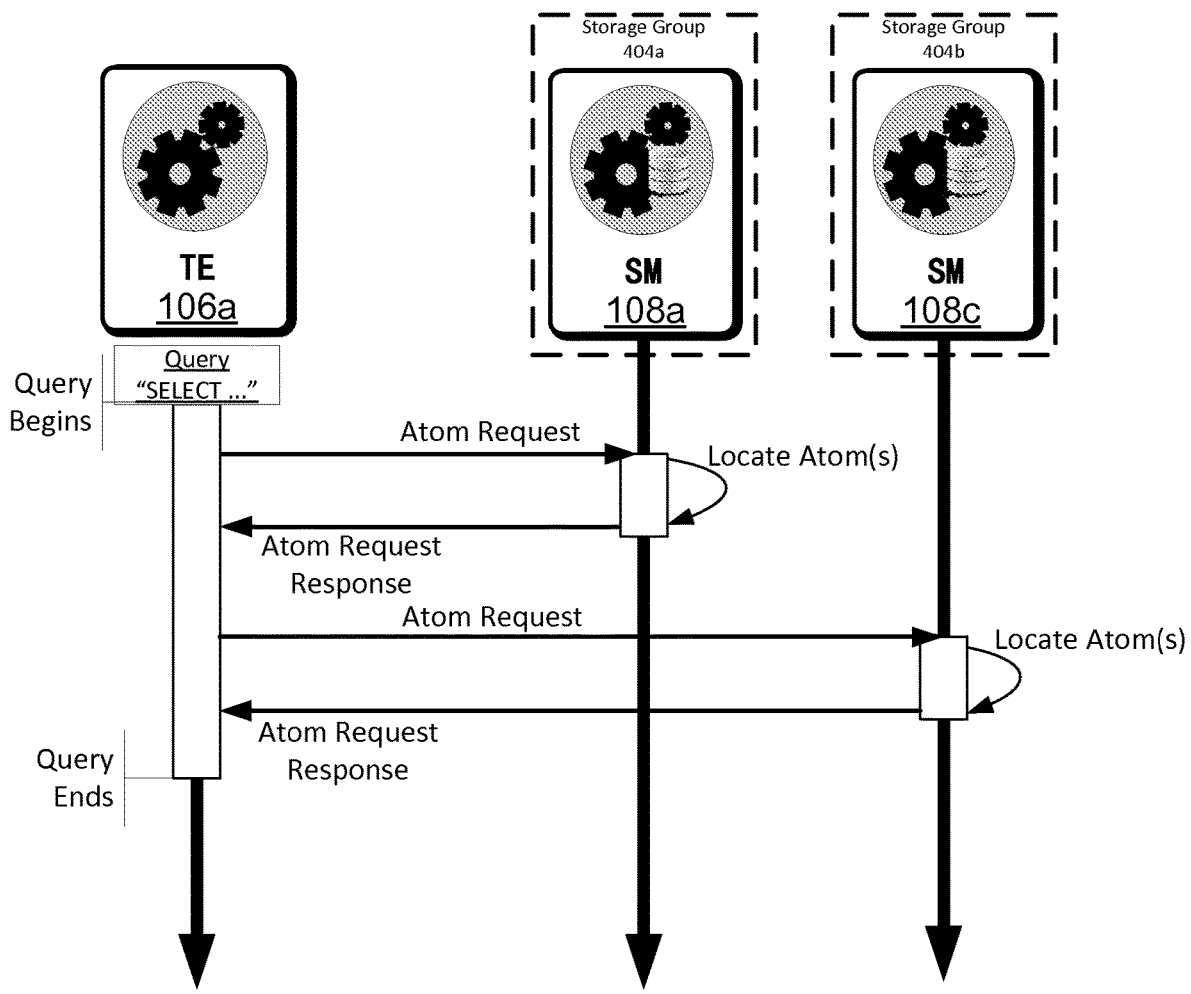

Referring now to FIG. 8b, an example data flow associated with the methodology of FIG. 8a is shown. As shown, TE node 106a enables a client (e.g., SQL client 102) to "view" a single, logical database within the distributed database system 100 and perform queries thereon.

Within the example context of the standard query ("SELECT . . . ") executed by the TE node 106a, one or more atoms are unavailable in the atom cache of the TE node 106a. In an embodiment, such atom availability determinations can be performed similar to act 806 of the methodology of FIG. 8a. As shown, the query executed on TE node 106a affects records in table partitions serviced by storage group 404a and 404b, respectively. Thus, the example embodiment of FIG. 7c depicts a distributed query. In accordance with act 810, the atoms corresponding to those affected table partitions can be mapped to a storage group, and ultimately, a filtered list of nodes, such as SM nodes 108a and 108b, that store those atoms in durable storage. To this end, the TE node 106a can send atom requests to SM nodes 108a and 108b, or any other node servicing those storage groups, to retrieve atoms that can be utilized to satisfy the query. In response, the SM nodes 108a and 108b retrieve the requested atoms from their respective atom cache, or their durable storage if need be, and then transmit back the requested atoms to the TE node 106a. Note, this interaction by TE 106*a* is shown between SM nodes 108*a* and 108*c*, respectively, but should be understood that any of the SM nodes within each respective storage group 404*a* and 404*b* could be utilized to service a given query, as discussed above with regard to act 810. In addition, it should be appreciated in light of this disclosure that virtually any database node in the transaction tier 107 and/or the persistence tier 109 could be utilized by the TE 106*a*, as atoms can be requested from any peer node having the requested atoms in a respective atom cache or durable storage, as the case may be. In such cases, retrieved atoms, and those atoms already present in the atom cache of the TE node 106*a*, can be utilized to service the query and return a result set, similar to act 808 discussed above with regard to FIG. 8*a*.

Computer System

FIG. 10 illustrates a computing system 1100 configured to execute one or more nodes of the distributed database system 100, in accordance with techniques and aspects provided in the present disclosure. As can be seen, the computing system 1100 includes a processor 1102, a data storage device 1104, a memory 1105, a network interface circuit 1108, an input/output interface 1110 and an interconnection element 1112. To execute at least some aspects provided herein, the processor 1102 receives and performs a series of instructions that result in the execution of routines and manipulation of data. In some cases, the processor is at least two processors. In some such cases, the processor may be multiple processors or a processor with a varying number of processing cores. The memory 1106 may be RAM and configured to store sequences of instructions and other data used during the operation of the computing system 1100. To this end, the memory 1106 may be a combination of volatile and non-volatile memory such as dynamic random access memory (DRAM), static RAM (SRAM), or flash memory, etc. The network interface circuit 1108 may be any interface device capable of network-based communication. Some examples of such a network interface circuit include an Ethernet, Bluetooth, Fibre Channel, Wi-Fi and RS-232 (Serial) interface. The data storage device 1104 includes any computer readable and writable non-transitory storage medium. The storage medium may have a sequence of instructions stored thereon that define a computer program that may be executed by the processor 1102. In addition, the storage medium may generally store data in contiguous and non-contiguous data structures within a file system of the storage device 1104. The storage medium may be an optical disk, flash memory, a solid state drive (SSD), etc. During operation, the computing system 1100 may cause data in the storage device 1104 to be moved to a memory device, such as the memory 1106, allowing for faster access. The input/output interface 1110 may comprise any number of components capable of data input and/or output. Such components may include, for example, a display device, a touchscreen device, a mouse, a keyboard, a microphone, and speakers. The interconnection element 1112 may comprise any communication channel or bus established between components of the computing system 1100 and operating in conformance with standard bus technologies such as USB, IDE, SCSI, PCI, etc.

Although the computing system 1100 is shown in one particular configuration, aspects and embodiments may be executed by computing systems with other configurations. Thus, numerous other computer configurations are within the scope of this disclosure. For example, the computing system 1100 may be a so-called "blade" server or other rack-mount server. In other examples, the computing system 1100 may implement a Windows®, or Mac OS® operating system. Many other operating systems may be used, and examples are not limited to any particular operating system.

Further Example Embodiments

Example 1 is a system for performing database transactions, the system comprising a network interface circuit configured to communicatively couple to a communication network, the communication network comprising a plurality of database nodes forming a distributed database, and a processor configured to be communicatively coupled to the network interface circuit, and configured to instantiate a transaction engine including a horizontal table partitioning mode configured to identify a plurality of records affected by a database transaction, each affected record being stored in a table partition, for each affected record, identify a subset of the database nodes that is responsible for storing the table partition in non-volatile memory based on a first table partitioning policy, and send a replication message to each identified subset of database nodes to manipulate a given record in accordance with the database transaction.

Example 2 includes the subject matter of Example 1, where the first table partitioning includes a partition criterion and an identifier of a table partition configured to store records satisfying the partition criterion.

Example 3 includes the subject matter of Example 2, where the partition criterion comprises a partitioning scheme including at least one of a range partitioning scheme, an interval partitioning scheme, and a list-based partitioning scheme.

Example 4 includes the subject matter of any of Examples 2-3, where the partition criterion further comprises a symbolic identifier of a storage group responsible for storing a given table partition, the symbolic identifier being at least one of a numeric identifier, a system-provided alias, a user-provided alias, and a globally unique identifier (GUID).

Example 5 includes the subject matter of any of Examples 1-4, where the subset of database nodes is identified based on a symbolic identifier within the first partition policy that references a storage group, the storage group being assigned to each database node of the subset of database nodes.

Example 6 includes the subject matter of any of Examples 1-5, where the subset of database nodes associated with each affected record is identified based on comparing each affected record to partition criteria in the first table partitioning policy to find a match, the match being based on a given record having a partition key value that satisfies at least one criterion of the criteria.

Example 7 includes the subject matter of any of Examples 1-6, where the system includes a second table partitioning policy, and where the first and second table partitioning policy include at least one partition criterion that references a same storage group.

Example 8 includes the subject matter of any of Examples 1-7, where the distributed database includes a table that is comprised of multiple table partitions, the multiple table partitions being stored by a same storage group.

Example 9 includes the subject matter of Example 8, where the at least two database nodes implement a unified table schema for the table such that distributed transactions can be executed by the system against the multiple table partitions stored on the at least two database nodes and include Atomicity, Consistency, Isolation, and Durability (ACID) properties.

Example 10 includes the subject matter of Example 9, where the database transaction causes a write operation to be performed in the non-volatile memory of each database node of the subset of database nodes, the write operation being at least one of a new record being inserted into a table partition stored in the non-volatile memory of the subset of database nodes, a new table partition being stored in the non-volatile memory of the subset of database nodes, a table partition being split into a first and second table partition and stored in the non-volatile memory of the subset of database nodes, two table partitions being merged into a single table partition and stored in the non-volatile memory of the subset of database nodes, a table partition being migrated from a non-volatile memory of at least one database node of the plurality of database nodes to the non-volatile memory of the subset of database nodes, and a table partition to be deleted from the volatile memory of the subset of database nodes.

Example 11 includes the subject matter of any of Examples 1-10, where the system provides a single, logical view of the distributed database to a database client such that write operations affecting a first portion of the distributed database are synchronized to the plurality of database nodes, and write operations affecting a second portion of the distributed database are synchronized only to the subset of database nodes of the plurality of database nodes.

Example 12 is a computer-implemented method for performing database queries, the method comprising parsing, by a processor, a database query received from a database client, the database query affecting a record stored in a table partition, determining an identifier of a table partition storing the record affected by the database query, identifying a storage group configured to service the table partition, the identified storage group comprising one or more database nodes configured to store the table partition in a non-volatile memory, requesting database objects associated with the affected record from the one or more database nodes, and in response to receiving the requested database objects, sending the database objects to the database client.

Example 13 includes the subject matter of Example 12, where parsing the database query from the database client further comprises identifying at least one table partitioning policy associated with a database table affected by the database query, and determining the partition identifier based on the at least one record affected by the database query satisfying partitioning criteria within the at least one table partitioning policy.

Example 14 includes the subject matter of any of Examples 12-13, where the storage group is identified based on a table partitioning policy.

Example 15 includes the subject matter of Example 14, where the storage group is represented by a symbolic identifier in the table partitioning policy, the symbolic identifier being at least one of a numeric identifier, a system-provided alias, a user-provided alias, and a globally unique identifier (GUID).

Example 16 includes the subject matter of any of Examples 12-15, where the database query affects records in a first table partition and a second table partition, each of the first table partition and the second table partition being serviced by a first storage group and a second storage group, respectively, and where requesting database objects associated with the at least one affected record from the one or more database nodes further comprises sending requests for database objects to at least one database node associated with the first storage group and to at least one database node associated with the second storage group.

Example 17 is a non-transitory computer-readable medium having a plurality of instructions encoded thereon that when executed by at least one processor cause a table partitioning process to be performed, the process being configured to identify a plurality of records affected by a database transaction, each affected record being stored in a table partition within a distributed database, for each affected record, identify a subset of database nodes of a plurality of database nodes responsible for storing the table partition for that affected record in non-volatile memory based on a first table partitioning policy, and send a replication message to each identified subset of database nodes to manipulate each affected record in accordance with the database transaction.

Example 18 includes the subject matter of Example 17, where the first table partitioning policy includes partition criteria and an identifier of a table partition configured to store records satisfying the partition criteria.

Example 19 includes the subject matter of any of Examples 17-18, where the distributed database includes a table that is comprised of multiple table partitions, the multiple table partitions being stored in a non-volatile memory of at least two database nodes of the plurality of database nodes.

Example 20 includes the subject matter of Example 19, where the at least two database nodes implement a unified table schema for each table such that distributed transactions can be executed by the system against the multiple table partitions stored on two or more database nodes and include Atomicity, Consistency, Isolation, and Durability (ACID) properties.

The foregoing description has been presented for the purposes of illustration and description. It is not intended to be exhaustive or to limit the disclosure to the precise form disclosed. It is intended that the scope of the disclosure be limited not by this detailed description, but rather by the claims appended hereto.

The invention claimed is:
1. A method of applying partitioning policies to database tables in a distributed database, the method comprising:
    storing a database table in the distributed database, the distributed database comprising a plurality of transaction engine nodes to perform database transactions on database records and a plurality of storage manager nodes to persist the database records in durable storage;
    partitioning the database table into a first partition and a second partition according to a table partitioning policy;
    assigning a first storage group to the first partition and a second storage group to the second partition;
    assigning the first storage group to a first subset of storage manager nodes in the plurality of storage manager nodes and the second storage group to a second subset of storage manager nodes in the plurality of storage manager nodes; and
    adding, removing, or updating which storage manager nodes are assigned to the first storage group without updating the table partitioning policy, wherein adding, removing, or updating which storage manager nodes are assigned to the first storage group comprises:
        determining, by a storage manager node being added to the first storage group, which atoms in the distributed database are associated with the first partition, the atoms representing database objects of the distributed database;
        determining, by the storage manager node, a subset of the atoms associated with the first partition to request from other storage manager nodes assigned to the first storage group; and obtaining, by the storage manager node, the subset of the atoms associated with the first partition from the other storage manager nodes assigned to the first storage group.

2. The method of claim 1, wherein adding, removing, or updating which storage manager nodes are assigned to the first storage group further comprises:
receiving, by the storage manager node being added to the first storage group, a storage group assignment message identifying the first storage group;
determining, by the storage manager node, if the first storage group exists; and
in response to determining that the first storage group does not exist, requesting creation of the first storage group.

3. The method of claim 2, wherein the storage group assignment message comprises a symbolic storage group identifier identifying the first storage group.

4. The method of claim 2, further comprising:
generating the storage group assignment message in response to an input from a user.

5. The method of claim 1, wherein adding, removing, or updating which storage manager nodes are assigned to the first storage group comprises:
broadcasting, by the storage manager node being assigned to the first storage group, a storage manager assignment message to each database node in the distributed database, the storage manager assignment message indicating that the storage manager node being assigned to the first storage group belongs to the first storage group.

6. The method of claim 1, wherein adding, removing, or updating which storage manager nodes are assigned to the first storage group further comprises:
receiving, by a storage manager node in the first storage group, a request to remove the first storage group from service; and
broadcasting, by the storage manager node, a message to all database nodes in the distributed database to remove the storage manager node from the first subset of storage manager nodes.

7. The method of claim 1, wherein adding,
the storage manager node being added to the first storage group is geographically diverse from the other storage manager nodes in the first storage group.

8. The method of claim 1, further comprising, while adding, removing, or updating which storage manager nodes are assigned to the first storage group:
accepting, by the storage manager node being added to the first storage group, read and write operations on the first partition.

9. The method of claim 1, wherein each storage manager node in the plurality of storage manager nodes belongs to at least one storage group in a plurality of storage groups comprising the first storage group and the second storage group, and further comprising:
storing, by the plurality of storage groups, all of the database records in the distributed database.

10. The method of claim 9, wherein the plurality of storage groups includes an unpartitioned storage group and each storage manager node of the plurality of storage manager nodes belongs to the unpartitioned storage group.

11. The method of claim 1, further comprising:
identifying and requesting, by a transaction engine node in the plurality of transaction engine nodes, a database object from at least one other transaction engine node in the plurality of transaction engine nodes for executing a database transaction.

12. The method of claim 1, further comprising:
identifying a first record and a second record in the distributed database affected by a database transaction, the first record being stored in the first partition and the second record being stored in the second partition; and
sending a replication message to each storage manager node in the first storage group and to each storage manager node in the second storage group to manipulate copies of the first record and copies of the second record in accordance with the database transaction.

13. The method of claim 1, further comprising:
assigning the first storage group to a third partition of the database table.

14. The method of claim 1, wherein assigning the first storage group to the first subset of storage manager nodes and the second storage group to the second subset of storage manager nodes comprises:
assigning a first storage manager node to both the first storage group and the second storage group.

15. A method of applying partitioning policies to database tables in a distributed database, the method comprising:
storing a database table in the distributed database, the distributed database comprising transaction engine nodes to perform database transactions on database records and storage manager nodes to persist the database records in durable storage;
partitioning the database table into partitions according to a table partitioning policy;
assigning a first storage manager node to a first storage group;
synchronizing the partitions and associated records stored by the first storage manager node with the partitions and associated records stored by other storage manager nodes in the first storage group; and
broadcasting a storage manager assignment message to each database node in the distributed database indicating that the first storage manager node belongs to the first storage group, wherein synchronizing the partitions and associated records stored by the first storage manager node with the partitions and associated records stored by other storage manager nodes in the first storage group comprises:
determining, by the first storage manager node, which atoms in the distributed database are associated with the partitions stored by the first storage group, the atoms representing database objects of the distributed database;
determining, by the first storage manager node, a subset of the atoms associated with the partitions stored by the first storage group to request from the other storage manager nodes assigned to the first storage group; and
obtaining, by the first storage manager node, the subset of the atoms associated with the partitions stored by the first storage group from the other storage manager nodes assigned to the first storage group.

16. The method of claim 15, wherein assigning the first storage manager node to the first storage group occurs without updating the table partitioning policy.

17. The method of claim 15, further comprising:
removing the first storage manager node from the first storage group without updating the table partitioning policy.

18. A distributed database system comprising:
a plurality of database nodes, each node in the plurality of database nodes comprising a corresponding processor, a corresponding memory, and a corresponding network interface, the plurality of database nodes comprising:
transaction engine nodes to perform database transactions on database records stored by the distributed database system; and
storage manager nodes to persist the database records in durable storage,
wherein the distributed database system is configured to store a database table partitioned into at least a first partition and a second partition according to a table partitioning policy,
wherein a first subset of the storage manager nodes is configured as a first storage group to store the first partition and a second subset of the storage manager nodes is configured as a second storage group to store the second partition, and
wherein the storage manager nodes assigned to the first storage group are configured to be added, removed, and/or updated without updating the table partitioning policy, wherein at least one of the storage manager nodes, in response to being added to the first storage group, is configured to:
determine which atoms are associated with the first partition, the atoms representing database objects stored by the distributed database system;
determine a subset of the atoms associated with the first partition to request from other storage manager nodes assigned to the first storage group; and
obtain the subset of the atoms associated with the first partition from the other storage manager nodes assigned to the first storage group.

* * * * *